(12) United States Patent
Maeda et al.

(10) Patent No.: US 7,646,528 B2
(45) Date of Patent: Jan. 12, 2010

(54) DEFORMABLE MIRROR DEVICE WITH OSCILLATING STATES

(75) Inventors: Yoshihiro Maeda, Hachioji (JP); Fusao Ishii, Menlo Park, CA (US); Hirotoshi Ichikawa, Hachioji (JP); Kazuma Arai, Hachioji (JP)

(73) Assignees: Silicon Quest Kabushiki-Kaisha (JP); Olympus Corporation (JP)

( * ) Notice: Subject to any disclaimer, the term of this patent is extended or adjusted under 35 U.S.C. 154(b) by 0 days.

(21) Appl. No.: 12/004,607

(22) Filed: Dec. 24, 2007

(65) Prior Publication Data
US 2008/0174855 A1 Jul. 24, 2008

Related U.S. Application Data

(60) Provisional application No. 60/877,237, filed on Dec. 26, 2006.

(51) Int. Cl.
G02B 26/00 (2006.01)
G02F 1/29 (2006.01)
G02B 26/06 (2006.01)

(52) U.S. Cl. .................. 359/290; 359/317; 359/223

(58) Field of Classification Search ......... 359/290–292, 359/198, 223–225, 245, 260–263, 298, 295, 359/301–303, 317–318
See application file for complete search history.

(56) References Cited

U.S. PATENT DOCUMENTS

| 5,142,405 | A | * | 8/1992 | Hornbeck | 359/226 |
|---|---|---|---|---|---|
| 5,999,306 | A | * | 12/1999 | Atobe et al. | 359/295 |
| 6,198,180 | B1 | | 3/2001 | Garcia | |
| 6,329,963 | B1 | | 12/2001 | Chiabrera et al. | |
| 6,535,319 | B2 | * | 3/2003 | Buzzetta et al. | 359/225 |
| 6,657,759 | B2 | | 12/2003 | Muller | |
| 6,781,731 | B2 | | 8/2004 | Choi | |
| 6,856,068 | B2 | | 2/2005 | Miller et al. | |
| 6,909,530 | B2 | | 6/2005 | Muller | |
| 6,999,224 | B2 | | 2/2006 | Huibers | |
| 7,042,609 | B2 | | 5/2006 | Buzzetta | |
| 7,304,782 | B2 | | 12/2007 | Kimura et al. | |
| 7,468,829 | B2 | | 12/2008 | Ogikubo et al. | |
| 2005/0190429 | A1 | * | 9/2005 | Ishii | 359/290 |
| 2007/0007849 | A1 | | 1/2007 | Ogikubo et al. | |

* cited by examiner

*Primary Examiner*—Scott J Sugarman
*Assistant Examiner*—Dawayne A Pinkney
(74) *Attorney, Agent, or Firm*—Bo-In Lin

(57) ABSTRACT

A mirror device which deflects incident light includes: a mirror arranged on a substrate and supported by a hinge; an address electrode deflecting the mirror to an ON state, an OFF state, or an oscillating state; a drive circuit applying a voltage to the address electrode; and a first stopper unit determining an oscillation amplitude in the oscillating state.

21 Claims, 19 Drawing Sheets

DEFORMABLE MIRROR DEVICE WITH OSCILLATING STATES

CROSS REFERENCE TO RELATED APPLICATIONS

This application is a Non-provisional application of a Provisional Application 60/877,237 filed on Dec. 26, 2006. The Provisional Application 60/840,878 is a Continuation in Part (CIP) Application of a pending U.S. patent application Ser. No. 11/121,543 filed on May 4, 2005. The application Ser. No. 11/121,543 is a Continuation in part (CIP) Application of three previously filed Applications. These three Applications are Ser. No. 10/698,620 filed on Nov. 1, 2003, Ser. No. 10/699,140 filed on Nov. 1, 2003, and Ser. No. 10/699,143 filed on Nov. 1, 2003 by one of the Applicants of this Patent Application. The disclosures made in these patent applications are hereby incorporated by reference in this patent application.

FIELD OF THE INVENTION

This invention relates to projection display systems. More particularly, this invention related to improvement of image display quality by increasing the levels of the gray scale by projecting image display light in the oscillating states of the micromirror devices to provide smaller controllable adjustment of light intensity.

BACKGROUND OF THE INVENTION

After the dominance of CRT technology in the display industry over 100 years, Flat Panel Display (noted as "FPD" hereinafter) and Projection Display have gained popularity because of the advantages of smaller form-factor and larger size of screen. Among several types of projection displays, projection displays using micro-display are gaining recognition by consumers because of high performance of picture quality as well as lower cost than FPDs. There are two types of micro-displays used for projection displays in the market. One is micro-LCD (Liquid Crystal Display) and the other is micromirror technology. Because a micromirror device uses un-polarized light, a micromirror device has an advantage on brightness over micro-LCD, which uses polarized light.

Even though there have been significant advances of the technologies implementing an electromechanical mirror device as an SLM in recent years, there are still limitations and difficulties when it is employed to provide a high quality image. Specifically, when the images are digitally controlled, the image quality is adversely affected due to the fact that the images are not displayed with a sufficient number of gray scales.

An electromechanical mirror device is drawing a considerable interest as an SLM. The electromechanical mirror device consists of "a mirror array" arraying a large number of mirror elements. In general, the mirror elements ranging from 60,000 to several millions are arrayed on a surface of a substrate in an electromechanical mirror device. Referring to FIG. 1A for an image display system 1 including a screen 2 is disclosed in a reference U.S. Pat. No. 5,214,420. A light source 10 is used for generating light energy for illuminating the screen 2. The generated light 9 is further collimated and directed toward a lens 12 by a mirror 11. Lenses 12, 13 and 14 form a beam columnator operative to columnate light 9 into a column of light 8. A spatial light modulator (SLM) 15 is controlled on the basis of data input by a computer 19 via a bus 18 and selectively redirects the portions of light from a path 7 toward an enlarger lens 5 and onto screen 2. The SLM 15 has a mirror array includes switchable reflective elements 17, 27, 37, and 47 each comprising a mirror 33 connected by a hinge 30 and supported on a surface 16 of a substrate in the electromechanical mirror device as shown in FIG. 1B. When the element 17 is in one position, a portion of the light from the path 7 is redirected along a path 6 to lens 5 where it is enlarged or spread along the path 4 to impinge on the screen 2 so as to form an illuminated pixel 3. When the element 17 is in another position, the light is redirected away from the display screen 2 and hence the pixel 3 is dark.

Most of the conventional image display devices such as the devices disclosed in U.S. Pat. No. 5,214,420 are implemented with a dual-state mirror control that controls the mirrors to operate at a state of either ON or OFF. The quality of an image display is limited due to the limited number of gray scales. Specifically, in a conventional control circuit that applies a PWM (Pulse Width Modulation), the quality of the image is limited by the LSB (least significant bit) or the least pulse width as control related to the ON or OFF state. Since the mirror is controlled to operate in an either ON or OFF state, the conventional image display apparatuses have no way to provide a pulse width to control the mirror that is shorter than the control duration allowable according to the LSB. The least quantity of light, which determines the least amount of adjustable brightness for adjusting the gray scale, is the light reflected during the time duration according to the least pulse width. The limited gray scale due to the LSB limitation leads to a degradation of the quality of the display image.

Specifically, FIG. 1C exemplifies a control circuit for controlling a mirror element according to the disclosure in the U.S. Pat. No. 5,285,407. The control circuit includes a memory cell 32. Various transistors are referred to as "M*" where "*" designates a transistor number and each transistor is an insulated gate field effect transistor. Transistors M5 and M7 are p-channel transistors; while transistors M6, M8, and M9 are n-channel transistors. The capacitances C1 and C2 represent the capacitive loads in the memory cell 32. The memory cell 32 includes an access switch transistor M9 and a latch 32a, which is based on a Static Random Access switch Memory (SRAM) design. The transistor M9 connected to a Row-line receives a DATA signal via a Bit-line. The memory cell 32-written data is accessed when the transistor M9 that has received the ROW signal on a Word-line is turned on. The latch 32a consists of two cross-coupled inverters, i.e., M5/M6 and M7/M8, which permit two stable states, that is, a state 1 is Node A high and Node B low, and a state 2 is Node A low and Node B high.

The control circuit as illustrated in FIG. 1C controls the micromirrors to switch between two states and the control circuit drives the mirror to oscillate to either an ON or OFF deflected angle (or position) as shown in FIG. 1A. The minimum quantity of light controllable to reflect from each mirror element for image display, i.e., the resolution of gray scale of image display for a digitally controlled image display apparatus, is determined by the least length of time that the mirror is controllable to hold at the ON position. The length of time that each mirror is controlled to hold at an ON position is in turn controlled by multiple bit words. FIG. 1D shows the "binary time periods" in the case of controlling SLM by four-bit words. As shown in FIG. 1D, the time periods have relative values of 1, 2, 4, and 8 that in turn determine the relative quantity of light of each of the four bits, where the "1" is least significant bit (LSB) and the "8" is the most significant bit. According to the PWM control mechanism, the minimum quantity of light that determines the resolution of the gray scale is a brightness controlled by using the "least significant bit" for holding the mirror at an ON position during a shortest controllable length of time.

In a simple example with n bits word for controlling the gray scale, one frame time is divided into ($2^n$-1) equal time slices. If one frame time is 16.7 msec., each time slice is 16.7/($2^n$-1) msec.

Having set these time lengths for each pixel in each frame of the image, the quantity of light in a pixel which is quantified as 0 time slices is black (no the quantity of light), 1 time slice is the quantity of light represented by the LSB, and 15 time slices (in the case of n=4) is the quantity of light represented by the maximum brightness. Based on quantity of light being quantified, the time of mirror holding at the ON position during one frame period is determined by each pixel. Thus, each pixel with a quantified value which is more than 0 time slices is displayed by the mirror holding at an ON position with the number of time slices corresponding to its quantity of light during one frame period. The viewer's eye integrates brightness of each pixel so that the image is displayed as if the image were generated with analog levels of light.

For controlling deflectable mirror devices, the PWM calls for the data to be formatted into "bit-planes", where each bit-plane corresponds to a bit weight of the quantity of light. Thus, when the brightness of each pixel is represented by an n-bit value, each frame of data has the n-bit-planes. Then, each bit-plane has a 0 or 1 value for each mirror element. In the PWM described in the preceding paragraphs, each bit-plane is independently loaded and the mirror elements are controlled according to bit-plane values corresponding to them during one frame. For example, the bit-plane representing the LSB of each pixel is displayed as 1 time slice.

As illustrated in FIG. 2A, when adjacent image pixels are displayed with very coarse gray scales caused by great differences of quantity of light, thus, artifacts are shown between these adjacent image pixels. That leads to the degradations of image qualities. The degradations of image qualities are specially pronounced in bright areas of image when there are "bigger gaps" of gray scale, i.e. quantity of light, between adjacent image pixels. It was observed in an image of a person that there were artifacts shown on the forehead, the sides of the nose and the upper arm. The artifacts are caused by a technical limitation that the digitally controlled image does not obtain a sufficient number of the gray scale, i.e. the levels of the quantity of light. At the bright spots of display, e.g., the forehead, the sides of the nose and the upper arm, the adjacent pixels are displayed with visible gaps of light intensities. When the levels of gray scales are increased, the image degradation will be much less even with only twice more levels of gray scales as illustrated in FIG. 2B.

FIG. 3A shows a picture to illustrate the degradation of the displayed image when an exaggerated coarse grayscale is employed. FIG. 3B shows a picture with typical grayscale, the image quality is improved but still shows some unnatural areas. At the bright spots of display, e.g., the forehead, the sides of the nose and the upper arm, the adjacent pixels are displayed with visible gaps of light intensities. When the levels of gray scales are increased, the image degradation will be much less even with only twice more levels of gray scales as illustrated in FIG. 2B.

The mirrors are controlled either at ON or OFF position. Then, the quantity of light of a displayed image is determined by the length of time each mirror holds at the ON position. In order to increase the number of levels of the quantity of light, the switching speed of the ON and OFF positions for the mirror must be increased. The digital control signals need to be increased to a higher number of bits. However, when the switching speed of the mirror deflection is increased, a stronger hinge for supporting the mirror is necessary to sustain for the required number of mirror deflections in switching to the ON and OFF positions. Furthermore, in order to drive the mirrors with a strengthened hinge toward the ON or OFF positions, application of a higher voltage to the electrode is required. The required high voltage may exceed twenty volts or even be as high as thirty volts. The mirrors produced by applying the CMOS technologies probably is not appropriate for operating the mirror at such a high range of voltages, and therefore the DMOS mirror devices may be required. In order to achieve a control of higher number of the gray scale, a more complicated production process and larger device areas are required to produce the DMOS mirror. Conventional mirror controls are therefore faced with a technical problem that a higher accuracy of mirror modulation to increase the gray scales and range of the operable voltage has to be sacrificed for the benefits of a smaller image display apparatus.

There are many patents related to the control of quantity of light. These patents include U.S. Pat. Nos. 5,589,852, 6,232,963, 6,592,227, 6,648,476, and 6,819,064. There are further patents and patent applications related to different sorts of light sources. These patents include U.S. Pat. Nos. 5,442,414, 6,036,318 and Application 20030147052. Also, The U.S. Pat. No. 6,746,123 has disclosed particular polarized light sources for preventing the loss of light. However, these patents or patent applications do not provide an effective solution to attain a sufficient number of gray scales in the digitally controlled image display system.

Furthermore, there are many patents related to a spatial light modulation that includes the U.S. Pat. Nos. 2,025,143, 2,682,010, 2,681,423, 4,087,810, 4,292,732, 4,405,209, 4,454,541, 4,592,628, 4,767,192, 4,842,396, 4,907,862, 5,214,420, 5,287,096, 5,506,597, and 5,489,952. However, these inventions do not provide a direct solution for a person skilled in the art to overcome the above-discussed limitations and difficulties. Therefore, a need still exists in the art of image display systems applying digital control of a micromirror array as an SLM to provide new and improved systems such that the above-discussed difficulties can be resolved. The most difficulty in increasing the number of gray scales is that the conventional systems have only ON or OFF state and the minimum ON time exists. The minimum ON time determines the height of the steps of gray scale in FIG. 2. There is no way to provide the brightness lower than the step. If a level of brightness lower than the step can be generated, it will increase gray scale and the degradation of picture quality will be improved substantially.

The following list includes other examples of related art associated with a deflecting light-based mirror device.

(1) U.S. Pat. No. 6,198,180 discloses a technology for changing the height of stoppers at the right and left of a mirror.

(2) U.S. Pat. No. 6,329,963 discloses a technology in which the height of a stopper at the right of a mirror differs from the height of a stopper at the left of the mirror.

(3) U.S. Pat. No. 6,535,319 discloses a technology for a MEMS mirror for optical communication and a technology for outputting light incident from one direction to multiple directions. It also discloses a technology for stopping a mirror at a plurality of positions by a movable stopper in order to hold the mirror oriented in a predetermined direction.

(4) U.S. Pat. No. 6,909,530 discloses a method for applying an electrostatic force from the mirror end direction to hold the mirror at a predetermined angle.

(5) U.S. Pat. No. 6,657,759 discloses a method for applying an electrostatic force from the mirror end direction to hold the mirror at a predetermined angle.
(6) U.S. Pat. No. 6,962,419 discloses that the mirror is positioned at three different positions.
(7) U.S. Pat. No. 7,042,609 discloses a movable stopper.
(8) U.S. Pat. No. 6,856,068 discloses how to place an elastic member at the end of a mirror or on an electrode.
(9) U.S. Pat. No. 5,589,852 discloses how to change the brightness of illumination light to two distinct levels.
(10) U.S. Pat. No. 6,781,731 discloses how to rotate a mirror in a different direction for each color.
(11) US Patent Application Ser. No. 20050206992 discloses how to operate a mirror in an oscillating mode or an intermediate control mode.
(12) US Patent Application Ser. No. 20050254116 discloses a control method for operating a mirror in an oscillating control mode or an intermediate control mode.
(13) US Patent Application Ser. No. 2005/0190429 discloses a technology for operating a mirror device in an oscillating control mode or an intermediate control mode.

SUMMARY OF THE INVENTION

One aspect of this invention is to achieve substantially higher grayscale for micromirror devices. The principle of the embodiments of this invention is to introduce intermediate states for the micromirrors to provide reduced controlled amount of light intensity to provide an image display system with sub-LSB brightness. Another aspect of this invention is to provide methods to control and drive micromirrors in the intermediate states. This display system disclosed in this invention can provide higher levels of grayscale compared with conventional micromirror systems.

An aspect of present invention is to achieve the above-mentioned advantage by providing a mirror device for deflecting incident light. The mirror device includes: a mirror arranged on a substrate and supported by a hinge, an address electrode for deflecting the mirror to an ON state, an OFF state, or an oscillating state. The mirror device further includes a drive circuit for applying a voltage to the address electrode, and a first stopper unit for determining oscillation amplitude in the oscillating state.

Another aspect of the present invention is to provide a mirror device for deflecting incident light that includes: a mirror arranged on a substrate and supported by a hinge substantially perpendicular to the substrate; a plurality of address electrodes for deflecting the mirror to an ON state, an OFF state, or an oscillating state or an intermediate state; a drive circuit for applying a voltage to the address electrode; and a stopper unit for determining the oscillating state or the intermediate state.

BRIEF DESCRIPTION OF DRAWINGS

The above-noted objects of this invention and other objects will become apparent from the following detailed description and claims when read in conjunction with the accompanying drawings wherein.

DETAILED DESCRIPTION OF THE PREFERRED EMBODIMENTS

The object of this invention is to achieve substantially a higher number of grayscales for displaying images implemented with micromirror devices as the spatial light modulator (SLM). The principle of the embodiments of this invention is to introduce intermediate states for the micromirrors to output light for image display that has sub-LSB brightness. The embodiments of this invention further provide methods to control the micromirrors for projecting the light for image display with the micromirrors at the intermediate states.

Figure 1A:
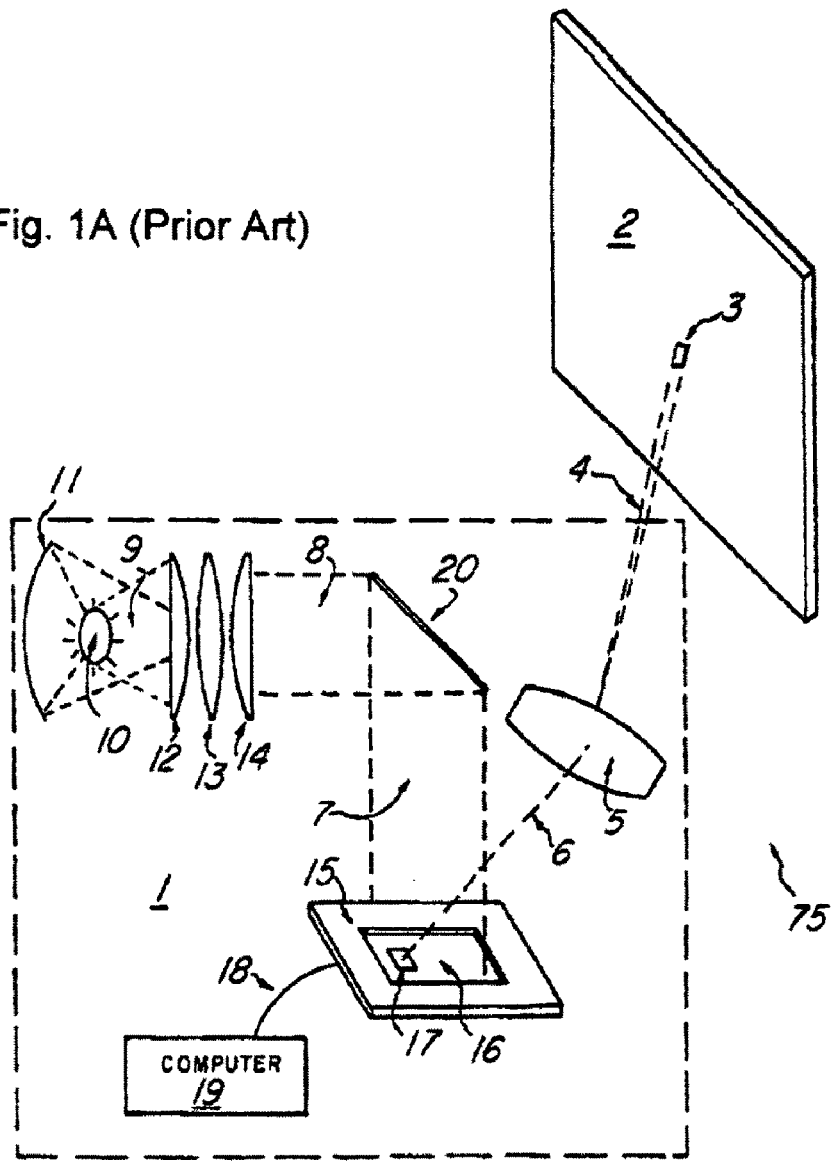
FIGS. 1A and 1B show a prior art illustrating the basic principle of a projection display using a micromirror device.
Figure 1B:
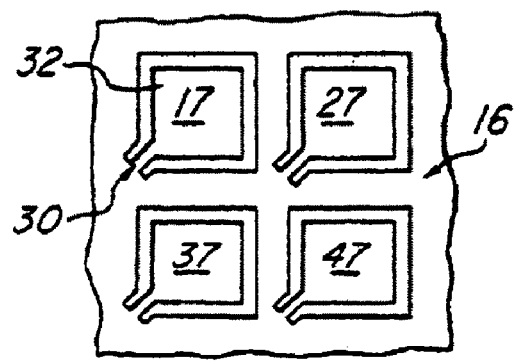
Figure 1C:
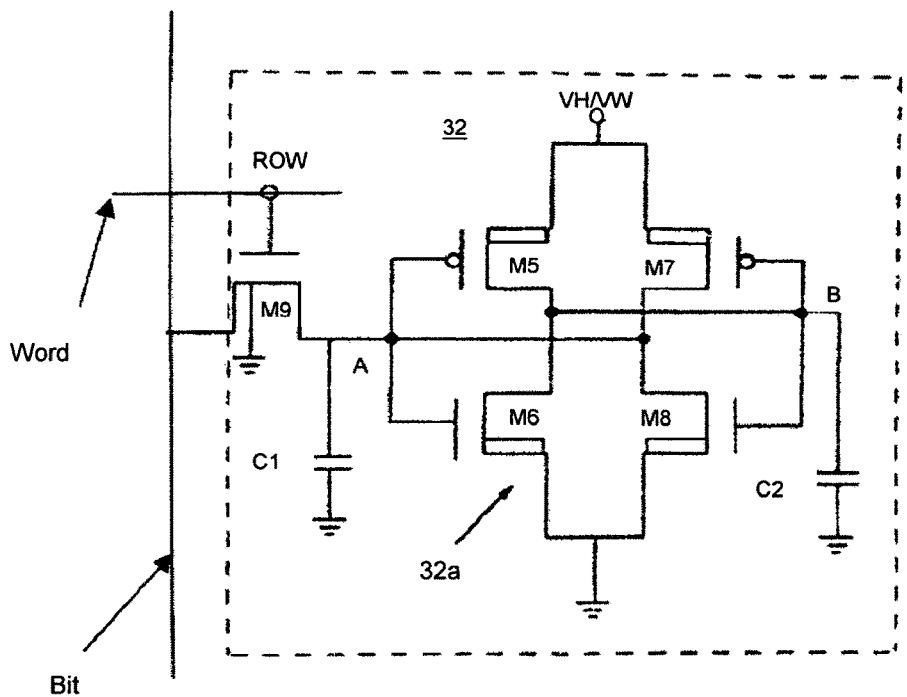
FIG. 1C shows an example of the driving circuit of prior arts
Figure 1D:
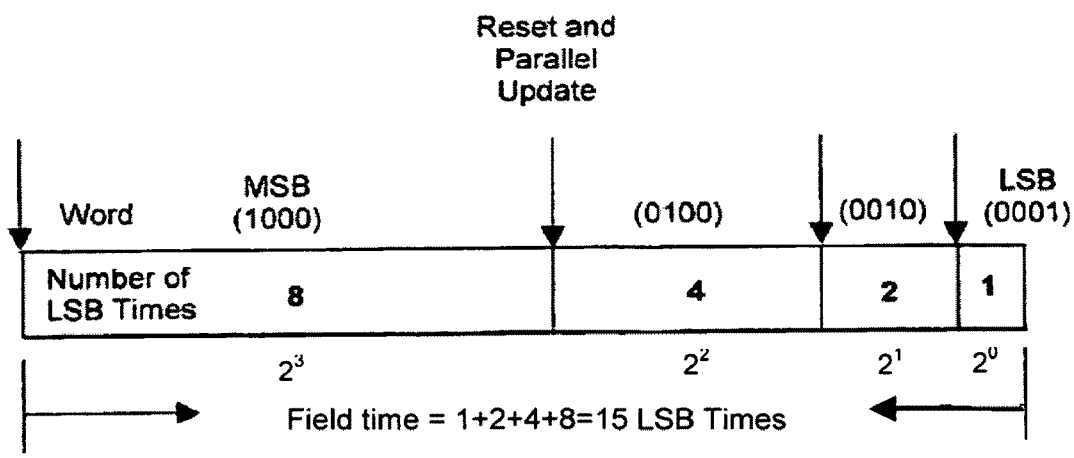
FIG. 1D shows the scheme of Binary Pulse Width Modulation (Binary PWM) of conventional digital micromirrors to generate grayscale.
Figures 2A, 2B:
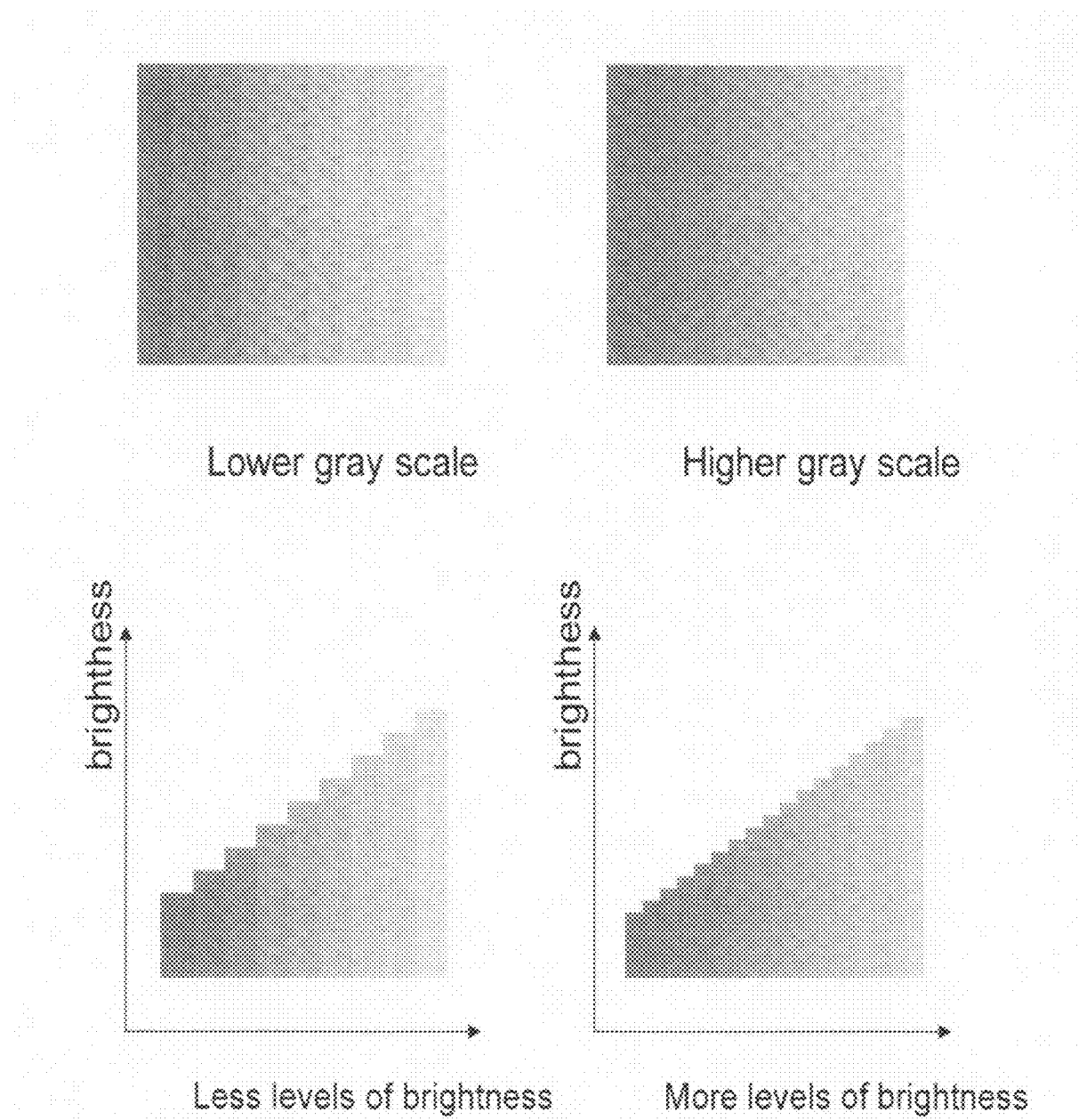
FIG. 2A shows an example of insufficient grayscale, where the minimum step of brightness change is very large and the artifacts are very visible.
FIG. 2B shows an example of improved grayscale, where the artifacts are less visible.
Figures 3A, 3B:
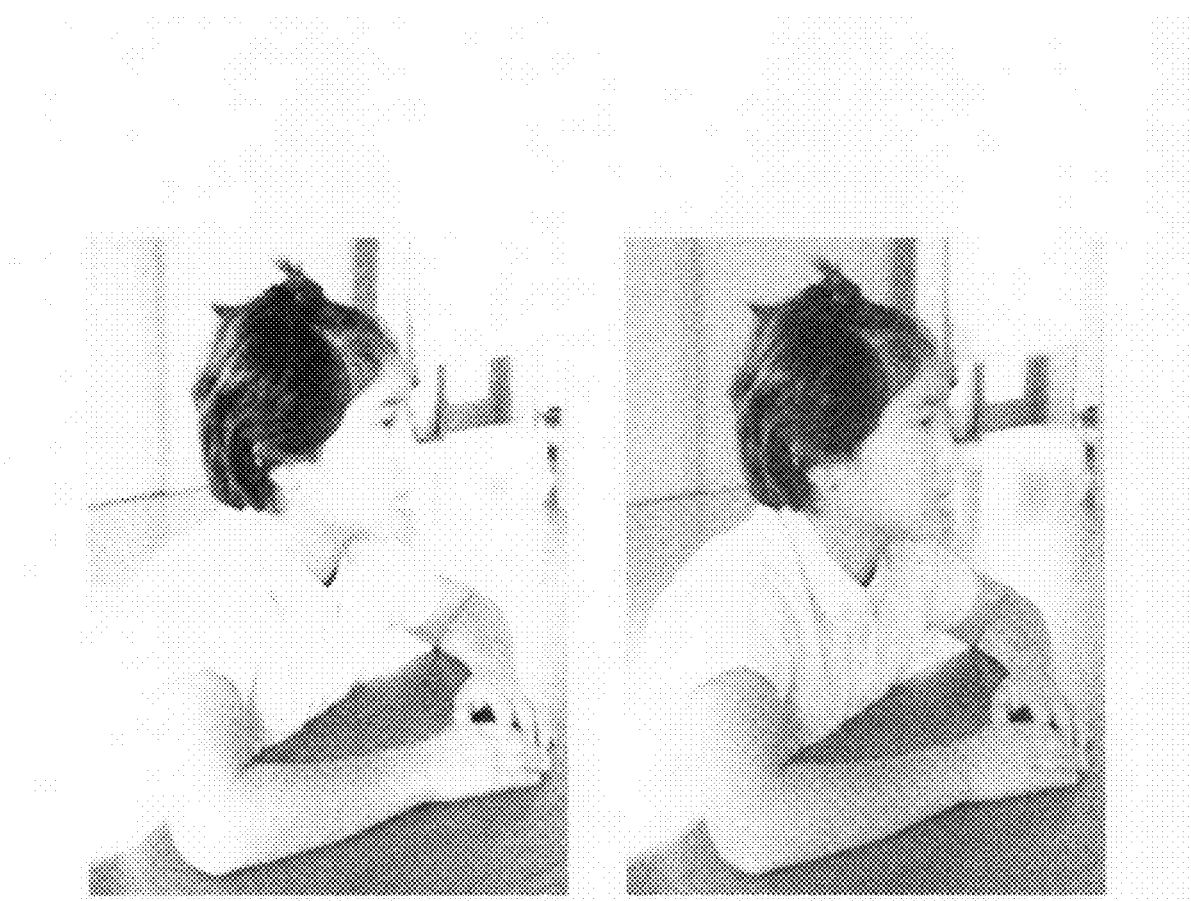
FIG. 3A shows an example of a picture having insufficient grayscale and very visible artifacts.
FIG. 3B shows an example of the same picture with improved grayscale.

The novel aspects of the present invention will now be described in conjunction with the drawings FIG. 4 to 13. FIG. 1A to 1D illustrate devices implemented with conventional technologies. FIGS. 2A and 2B illustrates the definition of gray scale and the artifacts arising from low gray scale representation. FIG. 3A illustrates a sample image with the artifacts due to insufficient grayscale, wherein the degradation of picture quality is clearly noticeable.

Specific time slices with a duration defined by a least significant bit (LSB) implemented for PWM-controlled grayscale display using a deformable mirror device will now be described. Typically, the time duration of one frame is 1/60 seconds that is 16.7 milliseconds). In a single-chip-sequential control system, the micromirrors are controlled for sequential modulation for each of the three colors of Red (R), (Green (G) and Blue (B) Modulation for controlling the grayscale for each color must therefore be processed within one third of 1/60 seconds (1/180 seconds). To control the modulation of mirrors with an 8-bit grayscale (256-grayscale), it is required to control each of the micromirrors corresponding to the lowest grayscale variation by a least significant bit (LSB) within approximately 20 microseconds (1/180×1/256=21.7). It is required to change the state of the mirror in the OFF-ON-OFF order within approximately 20 microseconds. Similarly, the available time for switching the state of a micromirror is reduced to approximately 5 microseconds to control the modulation by applying 10-bit levels of grayscales, and approximately 1.25 microseconds to control the modulation by applying 12-bit levels of grayscales.

Thus, to shorten the LSB time slice to increase the number of grayscales for improving the image display quality, it is necessary to shorten the deflection cyclic time of the mirror. The mirror is joined to an elastic hinge. In order to shorten the mirror oscillation cycle time, it is necessary to provide a stiff spring hinge by increasing its elasticity. Therefore, it is necessary to increase the geometrical moment of inertia of the spring or use a material with a high Young's modulus. However, this increases the stress in the mirror accordingly, reducing the life of the hinge. Furthermore, the voltage between the mirror and the electrode becomes undesirably higher than a voltage conventionally used in order to operate the mirror with stiff spring hinge. At present, the voltage between the mirror and the electrode required for the current 8 to 9-bit grayscale display is approximately 25 V.

The brightness of the output of a mirror is determined by the following formula:

Minimum Brightness=Intensity of incoming light×
Reflectance×*LSB* (time)

It is desirable to have as high intensity of incoming light as possible for brighter display. Furthermore, in this invention, the LSB time slice is reduced as short as possible to increase the number of grayscales for image display. The further improvement requires a substantially higher driving voltage and it is not adequate for commercial and practical reasons. However there is one more freedom to control the minimum amount of brightness adjustment by changing the reflectance of mirrors dynamically.

Figure 4A:
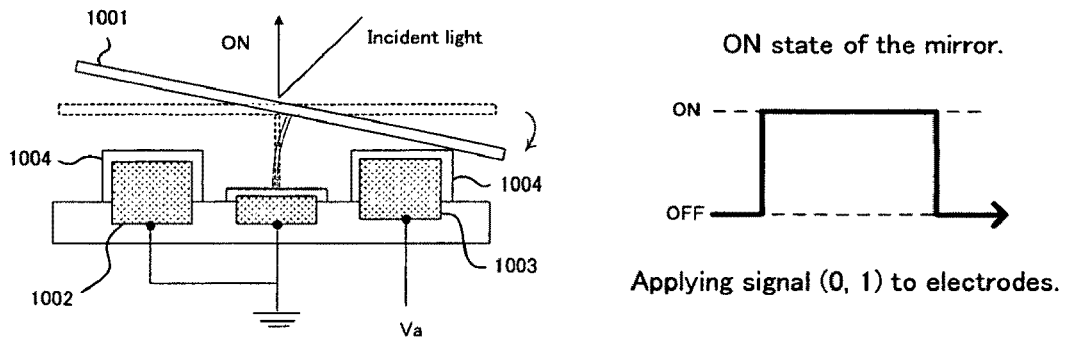
FIG. 4A illustrates an example of a micromirror at an ON state which reflects incoming light fully.
Figure 4B:
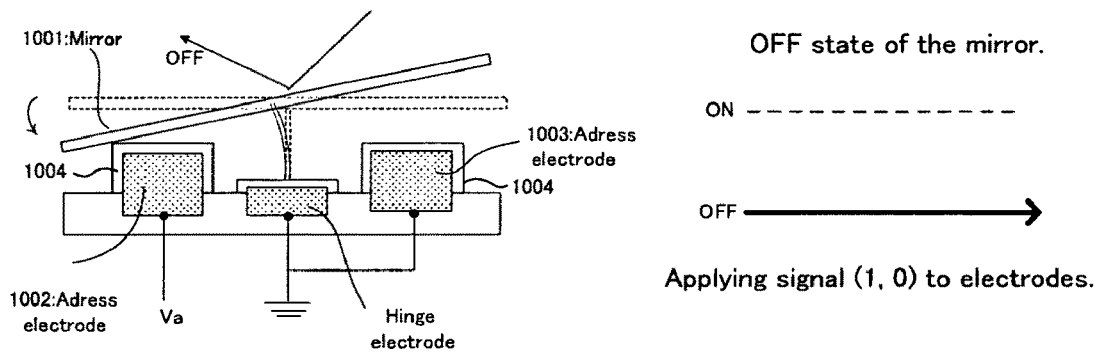
FIG. 4B illustrates an example of a micromirror at an OFF state which does not reflect incoming light.

The reflectance can be changed by changing the mirror angles as illustrated in FIGS. 4A and 4B. The ON position of a mirror 1001 is usually designed as the position that provides the maximum brightness and the OFF position is to provide the minimum brightness within the drivable range of angles. By keeping mirrors in the position that reflects light partially, the micromirror is controllable to obtain sub-LSB brightness and increase the levels of grayscale.

In the conventional systems, a mirror 1001 is driven to an ON position with (0, 1) signal to the electrodes 1002, 1003 beneath the mirror 1001, wherein (0, 1) is defined as zero volt is applied to the left electrode 1002 and an ON voltage is applied to the right electrode 1003 as illustrated in FIG. 4A. (1, 0) will be applied to drive the mirror 1001 to an OFF position.

Figure 4C:
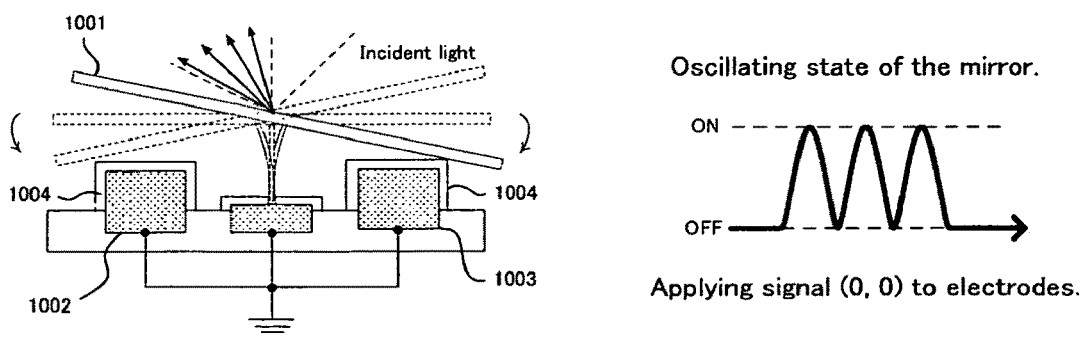
FIG. 4C illustrates an example of a micromirror at an oscillating state which reflects incoming light partially.

As illustrated in FIG. 4C, by keeping a mirror 1001 in an oscillating condition, the intensity of output light is kept below that of ON position. The oscillation of a mirror is achieved by providing two electrodes 1002, 1003 under the mirror 1001 with zero volts or (0, 0), when the mirror 1001 is in the position of ON or OFF state. The driving circuit in FIG. 1C implemented in the prior art system cannot achieve the controllable oscillation and requires a multi-bit input system. Various computerized simulations revealed that the average reflectance is from 20% to 40% of the fully on brightness depending on optical configurations. By properly designing an optical system, it is achievable to adjust the reflectance to 25% or 1/4. This enables the modulation of the micromirrors to obtain 1/4 of the output brightness without changing the intensity of the incoming light.

By applying multiple pulses to the electrodes 1002, 1003 under the mirror 1001 as illustrated in FIG. 4C as shown in the arrows in left side, in the middle of an ON position, the micromirror can be controlled to provide 3/4 of reflectance.

Additionally, each of the deformable elements arranged in an array in the deformable mirror device can also be configured as described below as alternate embodiments as well as the configuration described above with reference to FIGS. 4A, 4B and 4C.

Figure 5A:
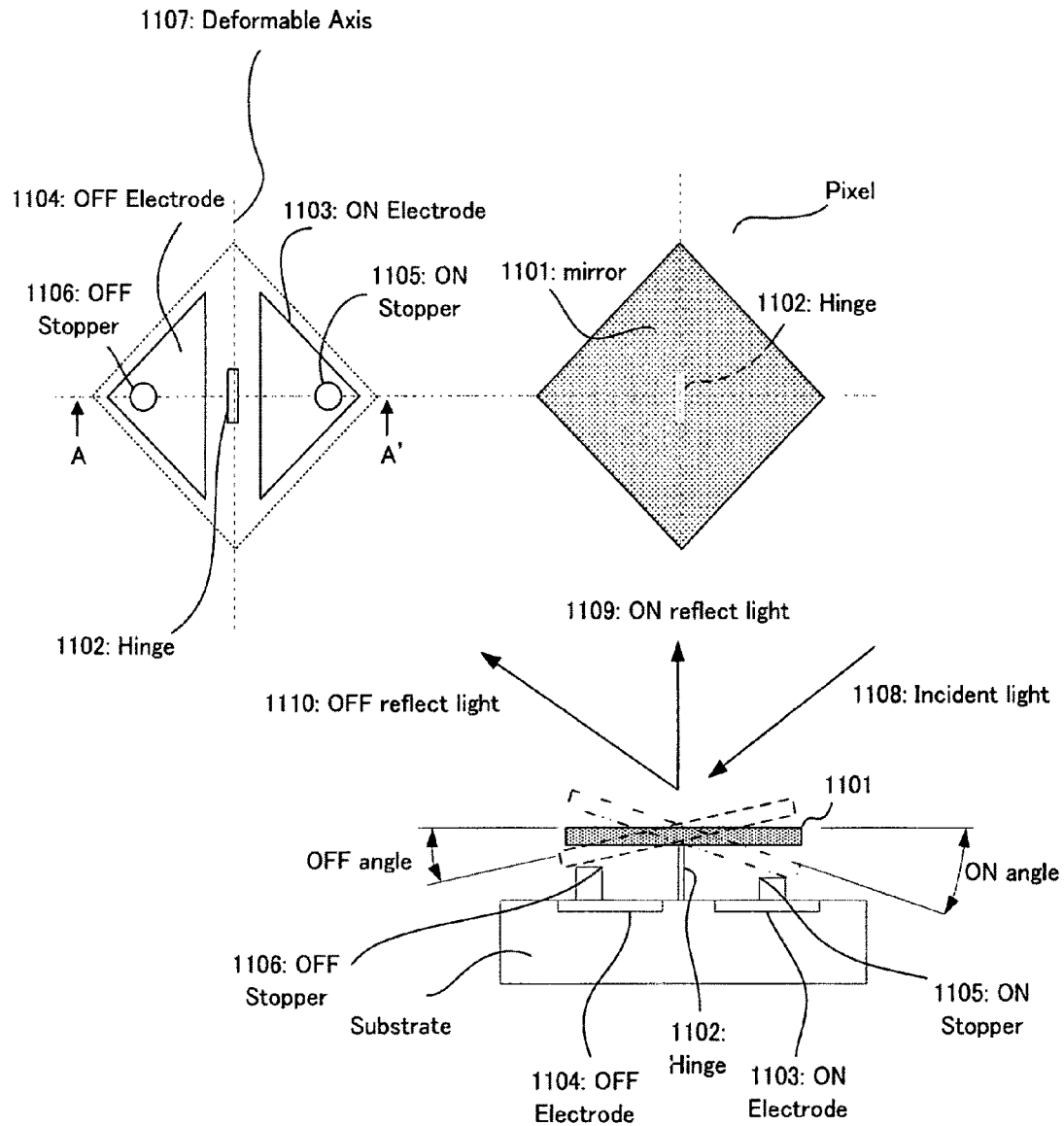
FIG. 5A illustrates another exemplary configuration of a deformable element.

FIG. 5A shows another exemplary configuration of the deformable pixel element implemented for control the modulation of light for displaying one pixel of the image. The upper right part of FIG. 5A shows a mirror 1101 of the deformable pixel element along with a hinge 1102 that supports the deflectable mirror. The upper left part of FIG. 5A shows the top surface of the deformable pixel element without the mirror 1101. The lower part of FIG. 5A shows a cross section of the deformable pixel element along with the deflectable mirror 1101 along the line AA'.

As shown in FIG. 5A, the deformable pixel element of this example is provided with a stopper 1105, 1106 on each of ON and OFF electrodes 1103, 1104. The distance from the ON stopper 1105 to the deformable axis 1107 is the same as the distance from the OFF stopper 1106 to the deformable axis 1107. The height of the ON stopper 1105 is lower than that of the OFF stopper 1106.

In such a configuration, when a predetermined voltage is applied to the ON electrode 1103, the mirror 1101 is controlled to operate in the ON state. The mirror 1101 is controlled to tilt until it abuts the ON stopper 1105, and reflects incident light 1108 to a projection lens along the direction of the ON reflect light 1109. The incident light 1108 is projected along a perpendicular direction relative to the deformable axis 1107 to impinge on the mirror 1101 at a predetermined angle of incidence. When a predetermined voltage is applied to the OFF electrode 1104, the mirror 1101 is controlled to tilt to the OFF state. The mirror 1101 continues to tilt toward the OFF state direction until it abuts the OFF stopper 1106, and reflects the incident light 1108 to the region outside the projection lens along the direction of the OFF reflect light 1110. When the voltage applied to the OFF electrode 1104 is terminated during the OFF state of the mirror 1101, the mirror 1101 is controlled to operated in the oscillating state. The mirror 1101 freely oscillates, and reflects the incident light 1108 in a direction according to the oscillating angle of the mirror 1101 between the ON and OFF states with a tilt angle between directions of 1109 and 1110. In an exemplary embodiment, the tilt angle of the mirror 1101 during the ON state (ON Angle) is +15 degrees, while the tilt angle of the mirror 1101 during the OFF state (OFF Angle) is −12 degrees.

In this example, the incident light 1108 impinges at 30 degrees with respect to the normal axis perpendicular to the array surface of the deformable mirror device. In general, in quite a few systems, the angle of incidence of the incoming light is designed to be 24 degrees with respect to the normal axis to the array surface of the deformable mirror device. A larger angle of incidence of the incoming light can further enlarge the sizes of the incoming light beam and the projection light beam. Therefore, brighter images can be projected.

Conversely, the height of the OFF stopper 1106 may be reduced. In this case, the mirror 1101 is controlled to operated in the oscillating state by terminating the voltage applied to the ON electrode 1103 during the ON state of the mirror 1101.

Figure 5B:
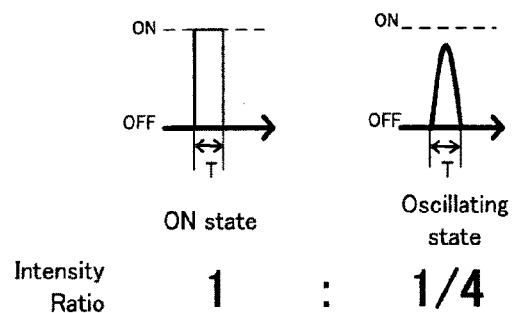
FIG. 5B illustrates the ratio of the intensity of the light that transmits a projection lens when a mirror is operated in the ON state to the intensity of the light when the mirror is operated in the oscillating state.

FIG. 5B shows the light intensity for image display projected from a mirror of FIG. 5A that is controlled to operate in an ON state and an oscillating state. The intensity of the light that transmits the projection lens when the mirror 1101 is brought into the ON state for a predetermined period of time T is 1. The intensity of the light when the mirror 1101 is brought into the oscillating state for the period of time T, i.e., from the current OFF state to the next OFF state in FIG. 5B is 1:¼. In this case, the reduced amount of controllable light intensity enables a four-time increase of the number of grayscales for image display.

In a conventional single-chip sequential method, the length of the LSB time slice controllable for displaying image with an 8-bit or 256 grayscale is approximately 20 microseconds. According to the invention, in the same time slice, the mirrors is controllable to achieve image display with gray scales represented by a 10-bit control word to achieve 1024 levels of grayscale. By operating the micromirrors with the oscillating state as described, the system using three mirror devices can achieve image display with controllable light intensity adjustment for each pixel represented by a 12-bit control word or 4096 levels of grayscale. Furthermore, by setting the ratio of the light intensity during the ON state to the light intensity during the oscillating state to 1:¹⁄₁₆, a 14-bit grayscale is achievable.

In contrast the conventional design concept of using a more rigid and stronger hinge to increase the levels of grayscale as described above, a softer hinge is preferred for increasing the levels of scales when operating the mirrors with an oscillating state, A softer hinge enable the mirror to have a longer oscillating cycle than the predetermined time T. The longer oscillating cycle time allows more flexibility to control the light intensity projected for image display during the oscillating state thus enables the modulation of the mirror to achieve higher levels of gray scale. A longer cycle of the oscillating state also reduces the stress in the hinge spring, so that the number of grayscale can be increased without any concern about adverse effects on the life of the hinge spring.

Furthermore, when the oscillation cycle is longer, the control period for controlling the mirror oscillation also becomes longer. This is beneficial because of the relaxation of the control period design requirement that may become very demanding when the number of pixels increases.

In an image display system, image signal is supplied for displaying each line of the mirror array with the duration of a display frame. The period of time required for supplying image signals to all or part of lines and returning to the first pixel again to supply an image signal for another line must be shorter than the LSB time slice. Thus, in terms of the data transfer time, a longer LSB time slice can accommodate a larger number of pixels when the data for each pixel in a line of display must be supplied within the duration of frame period.

Figure 5C:
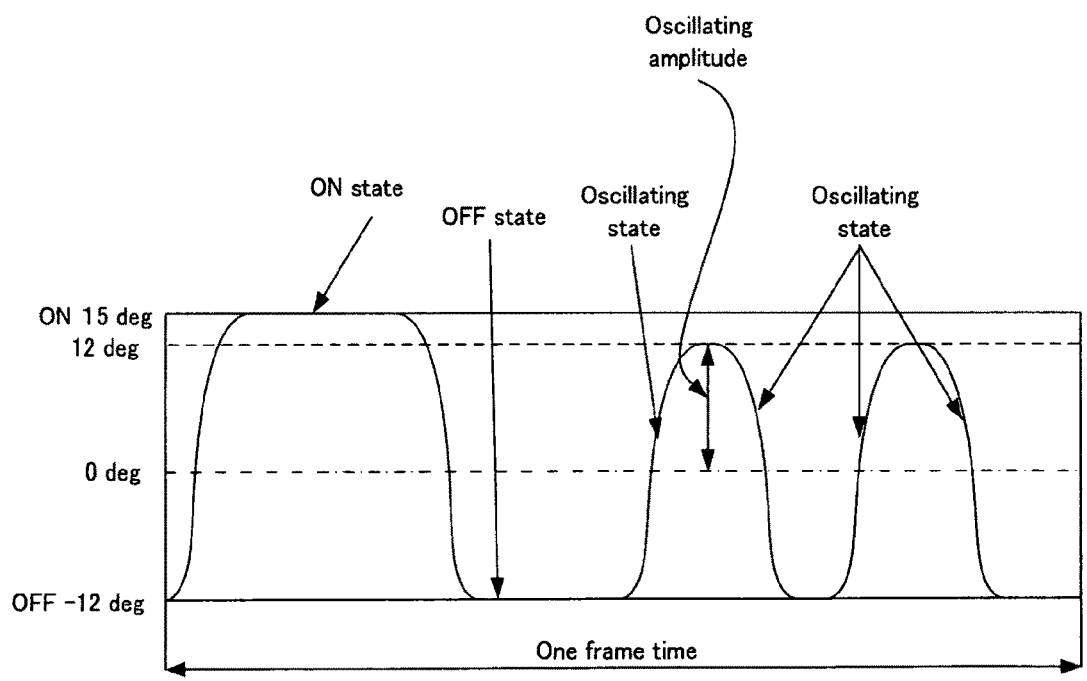
FIG. 5C illustrates an example of the state of the mirror of the deformable element illustrated in FIG. 5A in one frame period.
Figure 5D:
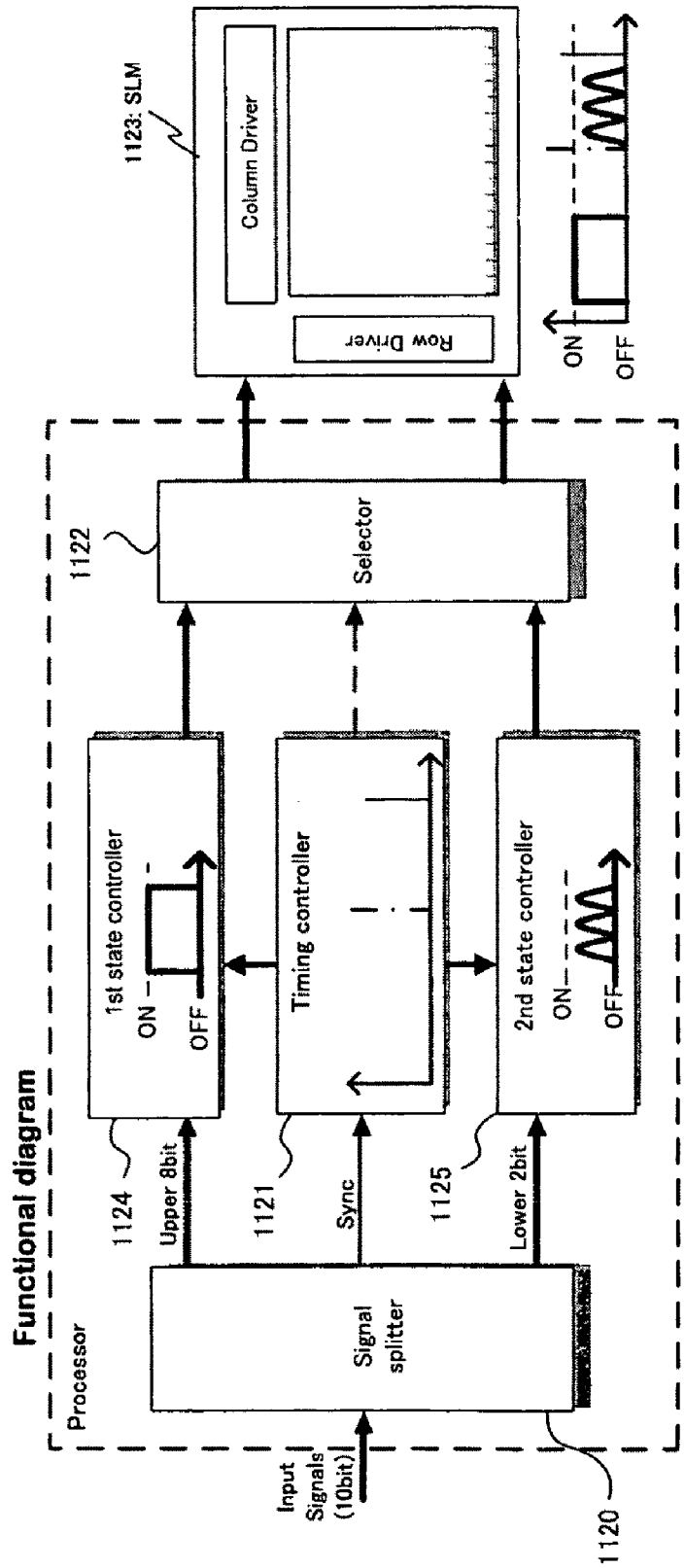
FIG. 5 D illustrates an example of a system diagram in accordance with the present invention.

FIG. 5C shows an example of the state of the mirror 1101 of the deformable pixel element shown in FIG. 5A in one frame period. As shown in FIG. 5C, in the deformable element is controlled to display images with grayscales corresponding to the tilt angles of the mirror 1101 within one frame period. During the time when the mirror is operated in the ON state, the mirror 1101 is tilted by +15 degrees. During the time when the mirror is operated in the OFF state, the mirror 1101 is tilted by −12 degrees. During the time when the mirror is operated in the oscillating state, the mirror 1101 is tilted and oscillated with an angle between −12 and +12 degrees.

The sync signal is generated in a signal splitter 1120. The timing controller 1121 controls the selector 1122 in response to the sync signal such that the selector 1122 switches the control of the SLM 1123 between the $1^{st}$ state controller 1124 and the $2^{nd}$ state controller 1125.

The control configuration allows the control of the $1^{st}$ state and the $2^{nd}$ state to flexibly intermix in one frame. When this is applied to a single-chip color sequential system, the $2^{nd}$ state is sequentially displayed at least at 180 Hz. According to the control mechanism shown above, a period of time for controlling the $2^{nd}$ state can be allocated in a sub-frame corresponding to each of the three colors of red, green and blue. Furthermore, cyan, magenta and yellow can also be added for six-color display.

Visual sensitivity of human eyes to color is highest at green. Therefore, only green is controlled to display in a 14-bit grayscale while the other colors may be controlled to display in a 12-bit grayscale. In some cases, in addition to red, green and blue, white light containing red, green and blue is used as illumination. In such kind of display systems, white light is controlled to display only for the $1^{st}$ state.

Figure 6A:
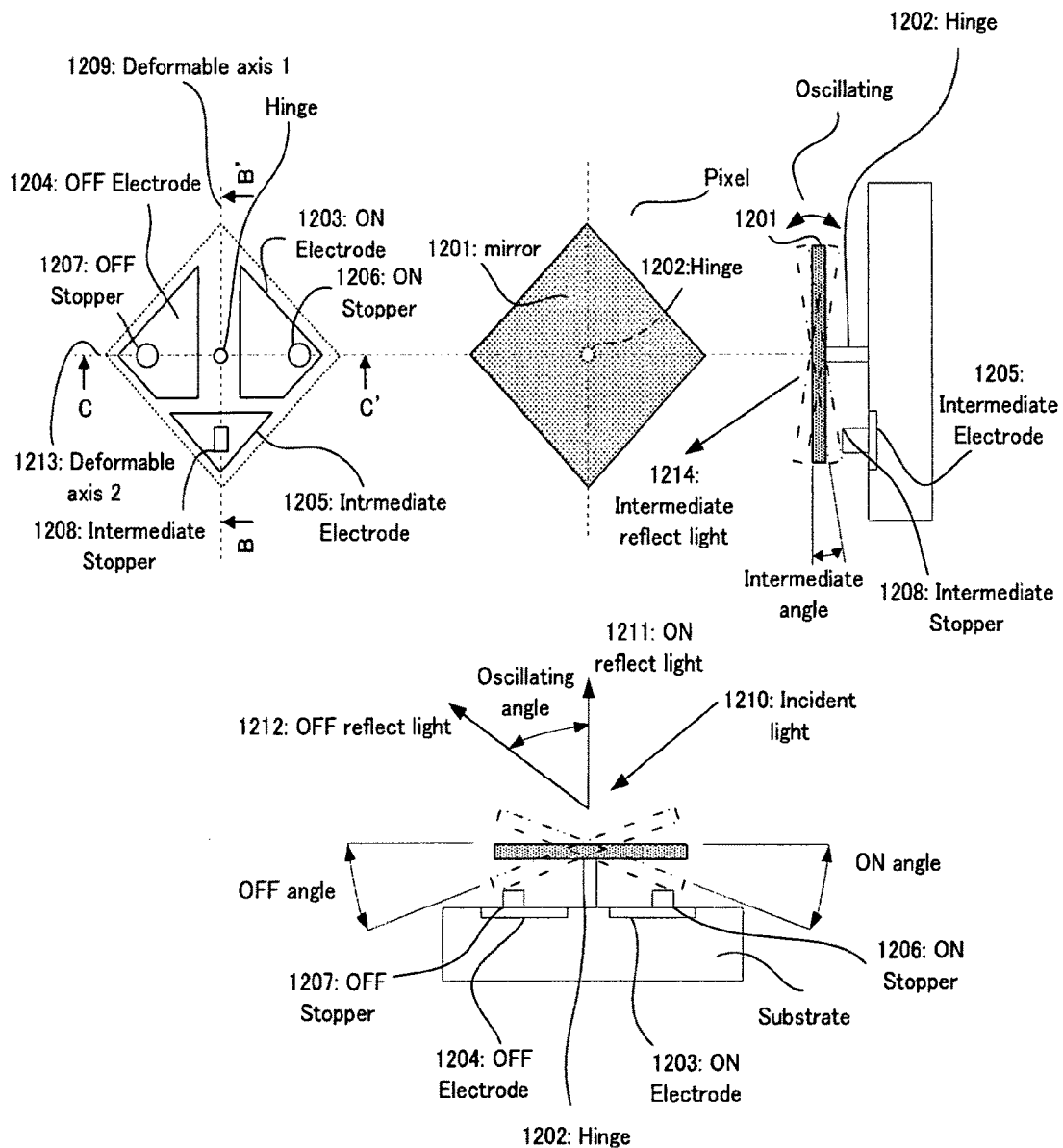
FIG. 6A illustrates another exemplary configuration of a deformable element.

FIG. 6A shows another exemplary configuration of the deformable pixel element. The upper center part of FIG. 6A shows the mirror 1201 of the deformable pixel element along with the hinge 1202 that supports the mirror element. The upper left part of FIG. 6A shows the top surface of the deformable element without the mirror 1201. The upper right part of FIG. 6A shows the cross section of the deformable element along with the mirror 1201 taken along the line BB'. The lower part of FIG. 6A shows the cross section of the deformable pixel element along with the mirror 1201 taken along the line CC'.

As show in FIG. 6A, the deformable pixel element of this example is provided with an electrode 1203, 1204, 1205 and a stopper 1206, 1207, 1208 for each of the ON, OFF and intermediate states. The distance from the ON stopper 1206 to the deformable axis 1 (1209) is the same as the distance from the OFF stopper 1207 to the deformable axis 1 (1209), and the height of the ON stopper 1206 is the same as that of the OFF stopper 1207. The height of the intermediate stopper 1208 is higher than that of the ON and OFF stoppers 1206, 1207. The cross-sectional shape and the height of the intermediate stopper 1208 are determined such that it will not come into contact with the mirror 1201 when the mirror 1201 tilts around the deformable axis 1 (1209) as the deformable axis. The cross-sectional shape of the hinge 1202 is substantially a circle.

Referring to the bottom part of FIG. 6A, when a predetermined voltage is applied to the ON electrode 1203, the mirror 1201 is controlled to operate in the ON state. The mirror 1201 tilts until it abuts the ON stopper 1206 along a direction of the deformable axis 1, i.e., axis 1209 shown as the deformable axis. The mirror reflects incident light 1210 to the projection lens along a direction of the ON reflect light 1211. The incident light 1210 is projected along a direction perpendicular to the deformable axis 1, i.e., axis 1209, and the incident light impinges on the mirror 1201 at a predetermined angle of incidence. When a predetermined voltage is applied to the OFF electrode 1204, the mirror 1201 is controlled to operate in the OFF state in which the mirror 1201 tilts until it abuts the OFF stopper 1207 relative to the deformable axis 1 (1209). The mirror reflects the incident light 1210 to the region outside the projection lens along a direction of the OFF reflect light 1212. When a predetermined voltage is applied to the intermediate electrode 1205 and terminates the voltage applied to the intermediate electrode 1205 after the mirror 1201 abuts the intermediate stopper 1208, the mirror 1201 is controlled to operate in the oscillating state. The mirror 1201 freely oscillates around the deformable axis 2 (1213), and reflects the incident light 1210 in a direction according to the tilt angles of the mirror 1201 that oscillates in the oscillating state. The mirror 1201 may also be held in the intermediate state for a fixed period of time in which the mirror 1201 abuts the intermediate stopper 1208 (see the Intermediate reflect light 1214). In this example, the tilt angles of the mirror 1201 during the ON state (ON Angle), during the OFF state (OFF Angle) and during the oscillating state (Intermediate angle) are +12 degrees, −12 degrees, and +3 to −3 degrees, respectively.

Figure 6B:
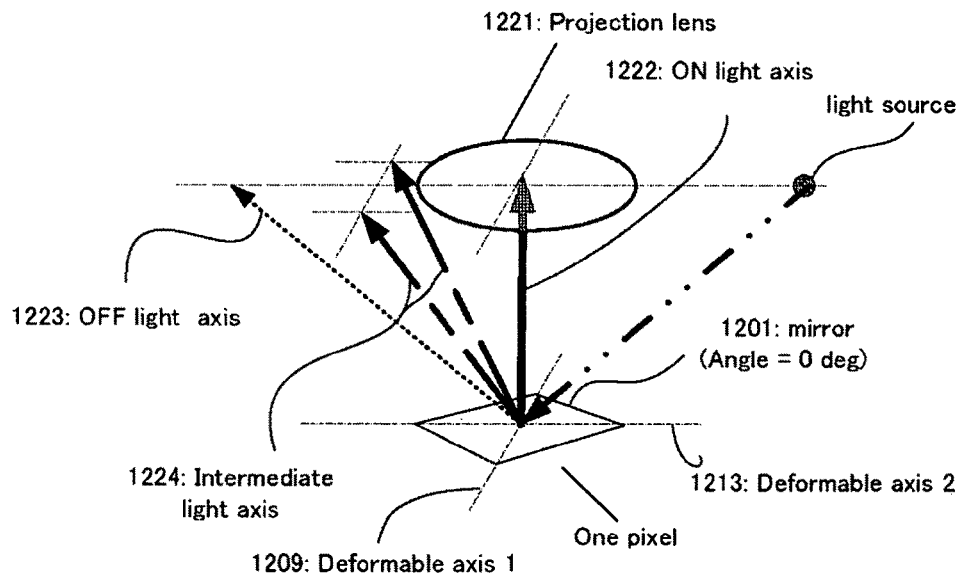
FIG. 6B illustrates the optical axis of the reflected light when the mirror is operated in the ON state, the OFF state and the oscillating state.

FIG. 6B shows the optical axis of the reflected light when the mirror 1201 is operated in the ON state, the OFF state and the oscillating state. As shown in FIG. 6B, the mirror 1201 tilts relative to the deformable axis 1 (1209) such that the mirror 1201 is controlled in an ON state to the incident light to the projection lens 1221 along the direction of the ON light axis 1222. In contrast, when the mirror 1201 is operated in the OFF state, it reflects the incident light to the region outside the projection lens 1221 along the direction of the OFF light axis 1223. On the other hand, when the mirror 1201 is oscillating around the deformable axis 2 (1213), the mirror 1201 reflects the incident light in a direction according to the oscillating state of the mirror 1201 that oscillates according to the movement of the Intermediate light axis 1224.

Figure 6C:
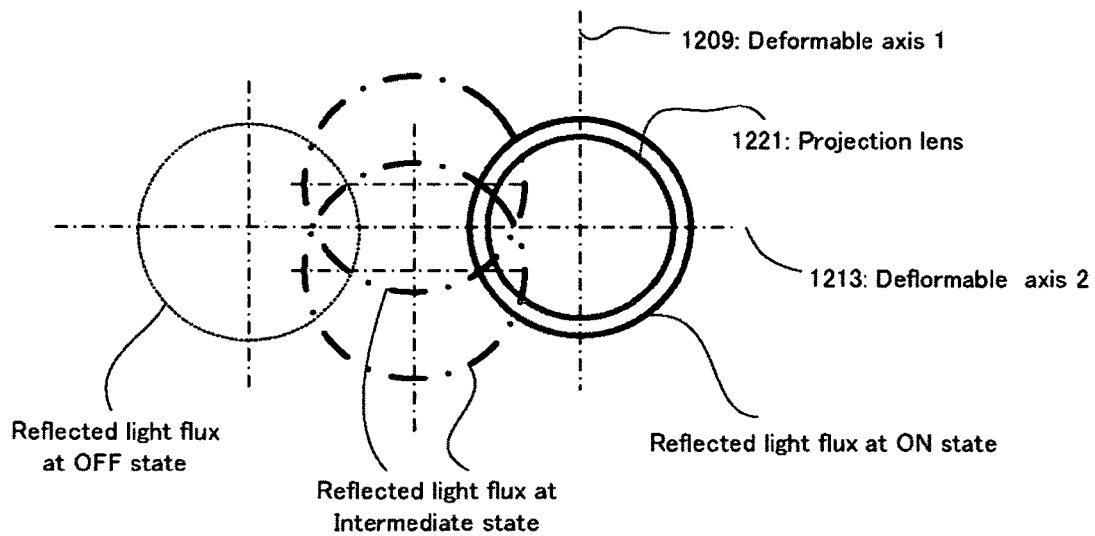
FIG. 6C illustrates the reflected light flux corresponding to each optical axis illustrated in FIG. 6B.

FIG. 6C shows the reflected light flux corresponding to each optical axis shown in FIG. 6B. As shown in FIG. 6C, the flux of the light reflected during the ON state enters the projection lens 1221 such that it covers the whole projection lens 1221. In this example, the diameter of the flux of the light reflected during the ON state is set to be larger than the aperture of the projection lens 1221. On the other hand, the flux of the light reflected during the OFF state is projected into the region outside the projection lens 1221. When the mirror is controlled to operate in an oscillating or intermediate state, only part of the flux of the light reflected enters and projected through the projection lens 1221 for displaying images.

Figure 6D:
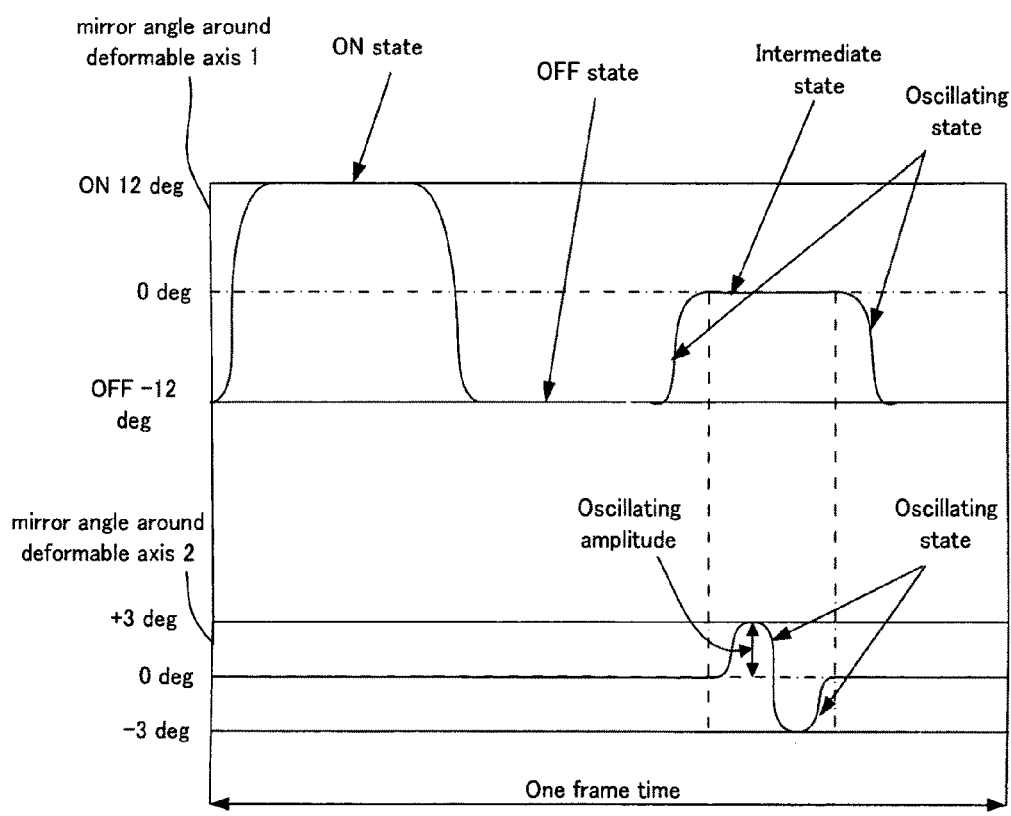
FIG. 6D illustrates an example of the state of the mirror of the deformable element illustrated in FIG. 6A in one frame period.

FIG. 6D shows an example of the state of the mirror 1201 of the deformable pixel element shown in FIG. 6A in one frame period. As shown in FIG. 6D, the grayscales are generated by not only by operating the mirror 1201 in the ON and OFF states in one frame period. The mirror 1201 is tilted by +12 degrees and −12 degrees respectively relative to the deformable axis 1 (1209). The mirror 1201 is also controlled to operate in the oscillating state that is also referred to as the Intermediate state in which the mirror 1201 is tilted by an angle between −3 and +3 degrees relative to the deformable axis 2 (1213).

Figure 7A:
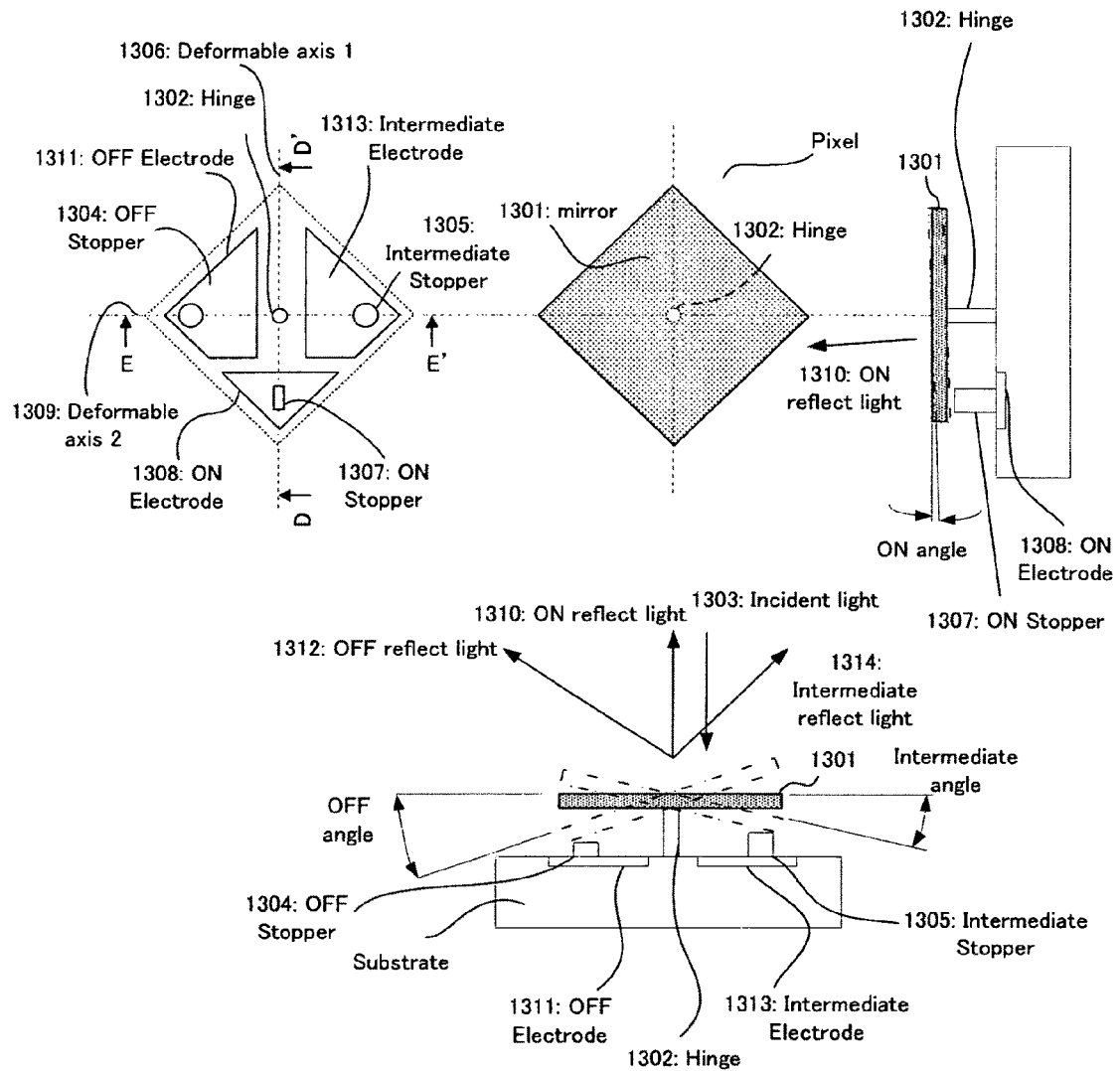
FIG. 7A illustrates another exemplary configuration of a deformable element.

FIG. 7A shows another exemplary configuration of the deformable pixel element. The upper center part of FIG. 7A shows the mirror 1301 of the deformable pixel element supported on the hinge 1302. The upper left part of FIG. 7A shows the top surface of the deformable pixel element without the mirror 1301. The upper right part of FIG. 7A shows the mirror 1301 and the cross sectional view of the deformable pixel element taken along the line DD'. The lower part of FIG. 7A shows the cross section of the deformable pixel element taken along the line EE'.

As shown in the lower part of FIG. 7A, the deformable pixel element of this embodiment is configured with the incident light 1303 impinges on the mirror 1301 at a normal angle of incidence similar to the deformable element shown in FIG. 6A. The layout of electrodes and stoppers and the height of the stoppers are set differently from those of the deformable element shown in FIG. 6A. The electrode 1203 and the stopper 1206 implemented as stoppers for the ON state in the deformable element shown in FIG. 6A are implemented here as the intermediate state in the deformable element shown in FIG. 7A. The electrode 1205 and the stopper 1208 implemented in FIG. 6A as the intermediate state are implemented here as stopper for the ON state. In FIG. 7A, the height of the OFF stopper 1304 is lower than that of the intermediate stopper 1305. The distance from the OFF stopper 1304 to the deformable axis 1 (1306) is the same as the distance from the intermediate stopper 1304 to the deformable axis 1 (1306). The cross-sectional shape and the height of the ON stopper 1307 are designed such that the stopper does not come into contact with the mirror 1301 when the mirror 1301 is controlled to tilt relative to the deformable axis 1 (1306).

Referring to FIG. 7A, by applying a predetermined voltage to the ON electrode 1308 the mirror 1301 is controlled to operated in the ON state. The mirror 1301 tilts until it abuts the ON stopper 1307 around the deformable axis 2 (1309) as the deformable axis for reflecting the incident light 1303 to the projection lens along the direction of the ON reflect light 1310. By applying a predetermined voltage to the OFF electrode 1311, the mirror 1301 is controlled to operate in the OFF state. The mirror 1301 tilts until it abuts the OFF stopper 1304 around the deformable axis 1 (1306) as the deformable axis for reflecting the incident light 1303 to the region outside projection lens along a direction of the OFF reflect light 1312. By applying a predetermined voltage to the intermediate electrode 1313 while terminating the voltage applied to the intermediate electrode 1313 after the mirror 1301 abuts the intermediate stopper 1305, the mirror 1301 is controlled to operate in the oscillating state. The mirror 1301 freely oscillates around the deformable axis 1 (1306) as the deformable axis for reflecting the incident light 1303 in a direction according to the oscillating angular position of the mirror 1301. The mirror 1301 may also be controlled in an angular position that the mirror 1301 abuts the intermediate stopper 1305 for a fixed period of time. The mirror thus reflects an Intermediate reflect light 1314. In this exemplary embodiment, the tilt angles of the mirror 1301 are controlled to operate in the ON state with an ON tilt Angle, during the OFF state with an OFF tilt Angle) and during the oscillating state with an Intermediate tilt angle. These tilt angles are predetermined small angle, such as angles of −15 degrees, and +9 to −9 degrees, respectively.

Figure 7B:
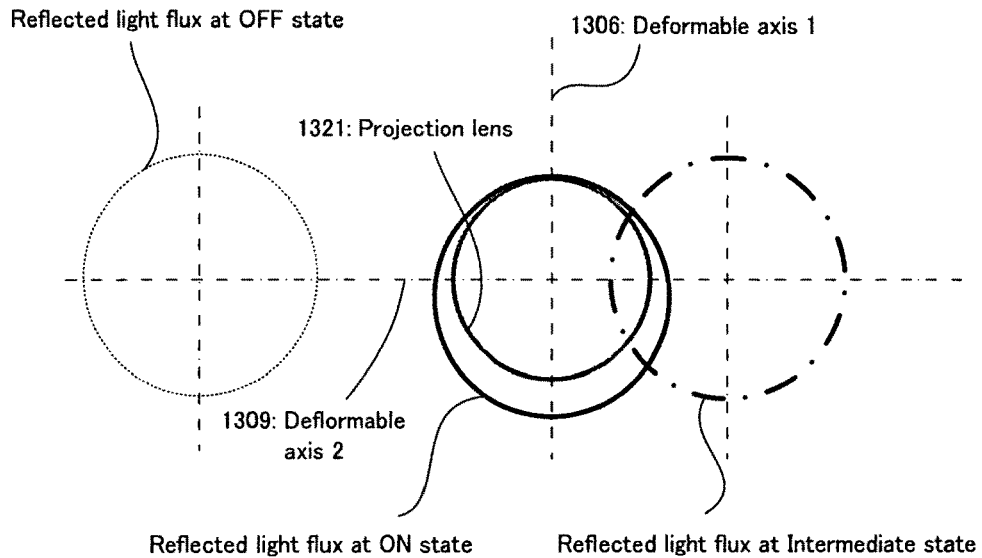
FIG. 7B illustrates the flux of each light reflected from the mirror.

FIG. 7B shows the cross sectional diagrams of the light flux of each light reflected from the mirror 1301. In FIG. 7B, although the center of the flux of the reflected light from the mirror during the ON state is slightly shifted from the center of the projection lens 1321, the flux of the reflected light still covers the whole projection lens 1321 because the diameter of the flux of the reflected light during the ON state larger than the aperture of the projection lens 1321. On the other hand, the flux of the reflected light during the OFF state is projected into the region outside the projection lens 1321. During either the oscillating state or the intermediate state, only part of the reflected light flux from the mirror 1301 is projected onto the projection lens 132 when the mirror is fully tilted to the intermediate stopper side as shown in FIG. 7B.

Figure 7C:
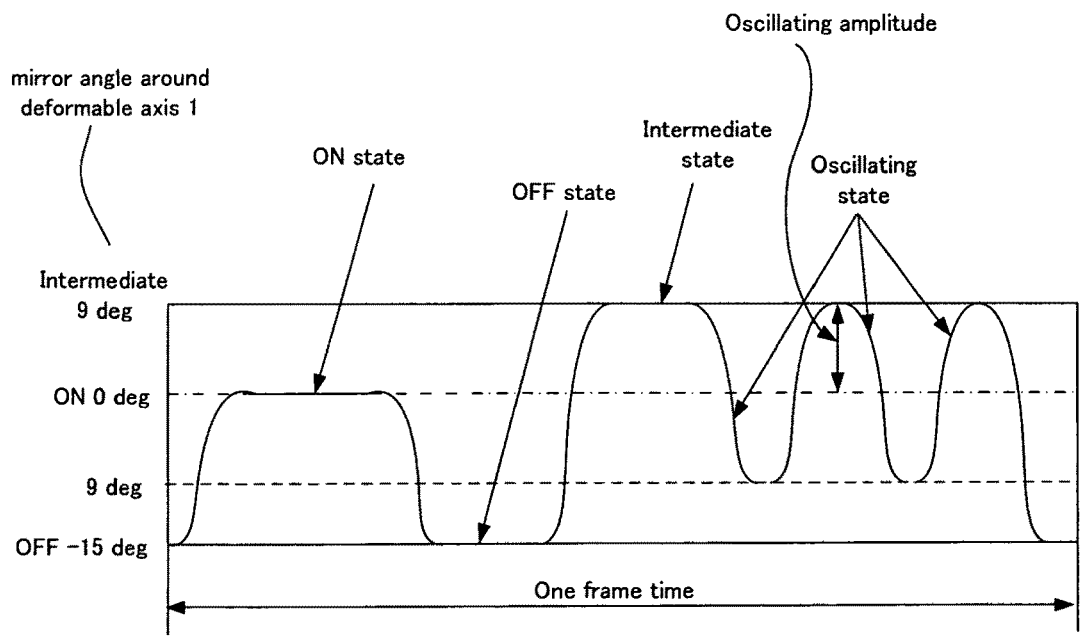
FIG. 7C illustrates an example of the state of the mirror of the deformable element illustrated in FIG. 7A in one frame period.

FIG. 7C is a timing diagram that shows an example of the state of the mirror 1301 of the deformable element shown in FIG. 7A in one frame period. In FIG. 7C, the grayscales of the light projected onto the image projection lens within one frame of time period are controlled not only by operating the mirror 1301. Furthermore, the mirror 1301 in an ON state is tilted by a predetermined degree by tilting relative to the deformable axis 2 (1309). Furthermore, the mirror 1301 is tilted relative to the deformable axis 1306 in the OFF state and the oscillating state by −15 degrees and by an angle between −9 and +9 degrees respectively as shown in the Intermediate state and the Oscillating state.

Referring again to FIGS. 7A, 7B, and 7C, the electrode and the stopper formed to control the mirror in the ON state are also implemented for controlling and operating the mirror in an intermediate state. Similarly, the electrode and the stopper implemented for controlling and operating the mirror in the intermediate state are also implemented for controlling and operating the mirror in the ON state. Additionally, in FIG. 6A, the electrode and the stopper implemented for controlling and operating the mirror in the OFF state can also be implemented for controlling and operating the mirror in the intermediate state. The electrode and the stopper implemented for controlling and operating the mirror in the intermediate state can also be implemented for controlling and operating the mirror in the OFF state. With such configuration, the mirror is controlled to operate in the oscillating state by oscillating between the intermediate state and the ON state.

Figure 8:
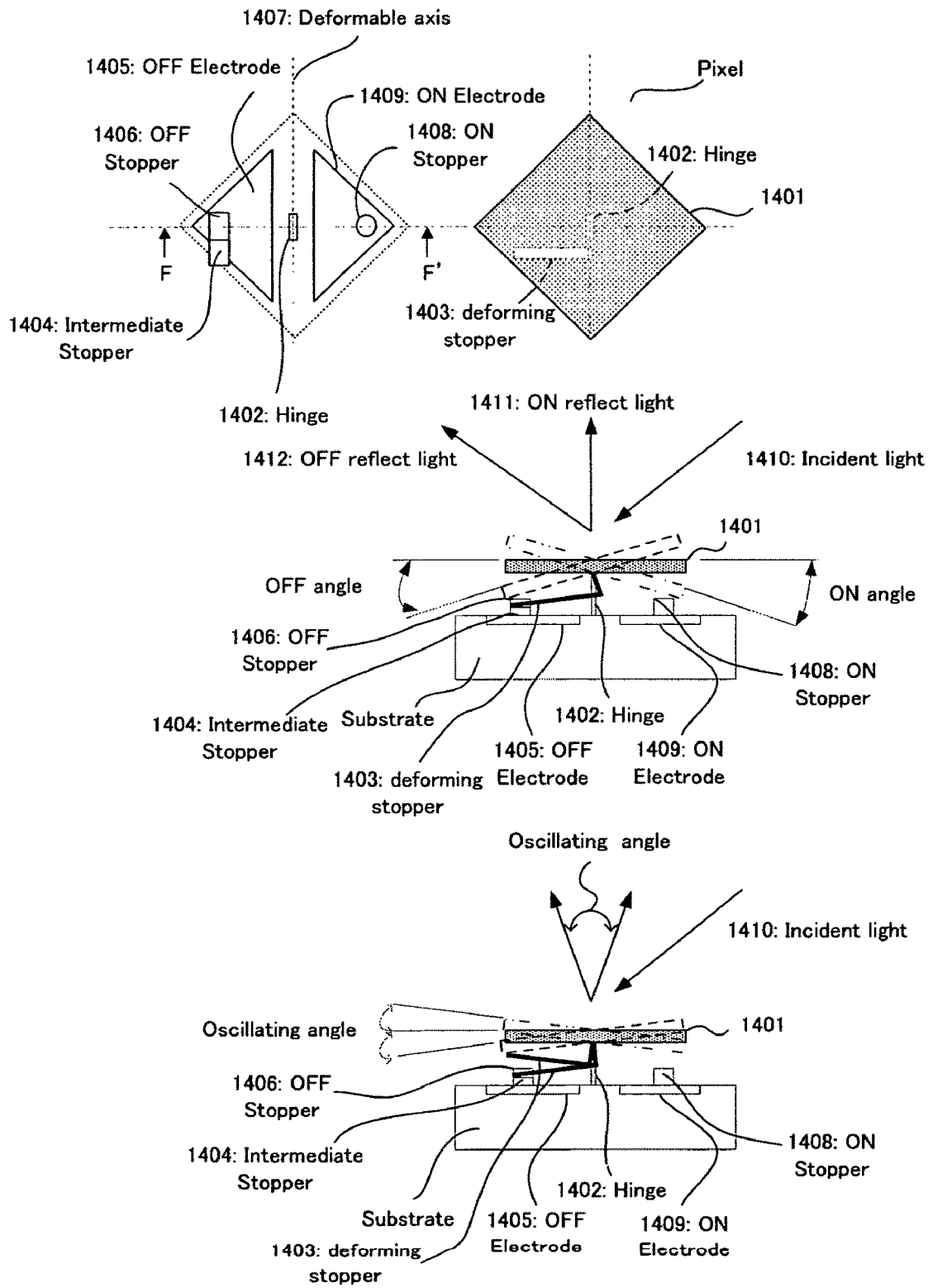
FIG. 8 illustrates another exemplary configuration of a deformable element.

FIG. 8 shows another exemplary configuration of the deformable pixel element. The upper right part of FIG. 8 shows the mirror 1401 of the deformable pixel element along with the hinge 1402 and a deforming stopper 1403. The upper left part of FIG. 8 shows the top surface of the deformable pixel element without the mirror 1401. The middle part of FIG. 8 shows the cross section of the deformable element (along with a cross section view of the mirror 1401, and the cross sectional view is taken along the line FF' for illustrating the ON and OFF states of the mirror 1401. The lower part of FIG. 8 shows the cross section of the deformable pixel element with the mirror 1401 taken along the line FF' with the mirror 1401 operated in the oscillating or intermediate state.

FIG. 8 shows the deformable pixel element similar to the deformable element shown in FIG. 5A. There are configuration and functional differences that the intermediate stopper 1404 is implemented also as the OFF electrode 1405. The deforming stopper 1403 shown as a leaf spring is provided on the rear side of the mirror 1401 The OFF stopper 1406 has a different cross section. The height of the intermediate stopper 1404 is lower than that of the OFF stopper 1406. The deforming stopper 1403 is an elastic member made of the same material as that of the hinge 1402. The deforming stopper 1403 is disposed to abut the upper surface of the intermediate stopper 1404 when the mirror 1401 is tilted toward the OFF stopper 1406, or alternately the intermediate stopper 1404 by a predetermined angle. The distance from the OFF stopper 1406 to the deformable axis 1407 is the same as the distance from the ON stopper 1408 to the deformable axis 1407.

By applying a predetermined voltage to the ON electrode 1409, the mirror 1401 is controlled to operate in the ON state. The mirror 1401 tilts until it abuts the ON stopper 1408 for reflecting the incident light 1410 to the projection lens along a direction of the ON reflect light 1411. The incident light 1410 is projected along a direction perpendicular to the deformable axis 1407 and impinges on the mirror 1401 at a predetermined angle of incidence. By applying a first predetermined voltage, e.g., 3V, to the OFF electrode 1405, the deforming stopper 1403 is controlled to come into contact with the intermediate stopper 1404. By applying the first predetermined voltage, the elastic force of the deforming stopper 1403 is greater than the electrostatic force applied by the OFF stopper to the mirror 1401. The tilting movement of the mirror 1401 stops at a position where the deforming stopper 1403 abuts the intermediate stopper 1404. By terminating the voltage application to the OFF electrode 1405, the mirror 1401 is controlled to operate in an oscillating state. The mirror 1401 freely oscillates for reflecting the incident light 1410 in a direction according to the oscillation state of the mirror 1401. On the other hand, by applying a second predetermined voltage, e.g., 5V, greater than the first predetermined voltage to the OFF electrode 1405, the deforming stopper 1403 is first moved to contact the intermediate stopper 1404. With greater electrostatic force applied by the OFF stopper 1406 to the mirror that is greater than the elastic force of the deforming stopper 1403, the mirror 1401 is tilted toward the OFF stopper 1406. The mirror 1401 is controlled to move until it abuts the OFF stopper 1406 for reflecting the incident light 1410 to the region outside the projection lens along the direction of the OFF reflect light 1412.

In this exemplary embodiment implemented with the deformable pixel element as described above, the grayscales are controlled and modulated by operating the mirror in the ON state, the OFF state and the oscillating state in one frame period as described above.

In the embodiments implemented with the deformable pixel elements shown in FIGS. 5A, 6A, 7A and 8, it is further noted that the positions where the stoppers are disposed are not limited to the positions shown in the figures. Alternate configurations and arrangements can be flexibly designed according to applications of particular display systems.

Figure 9:
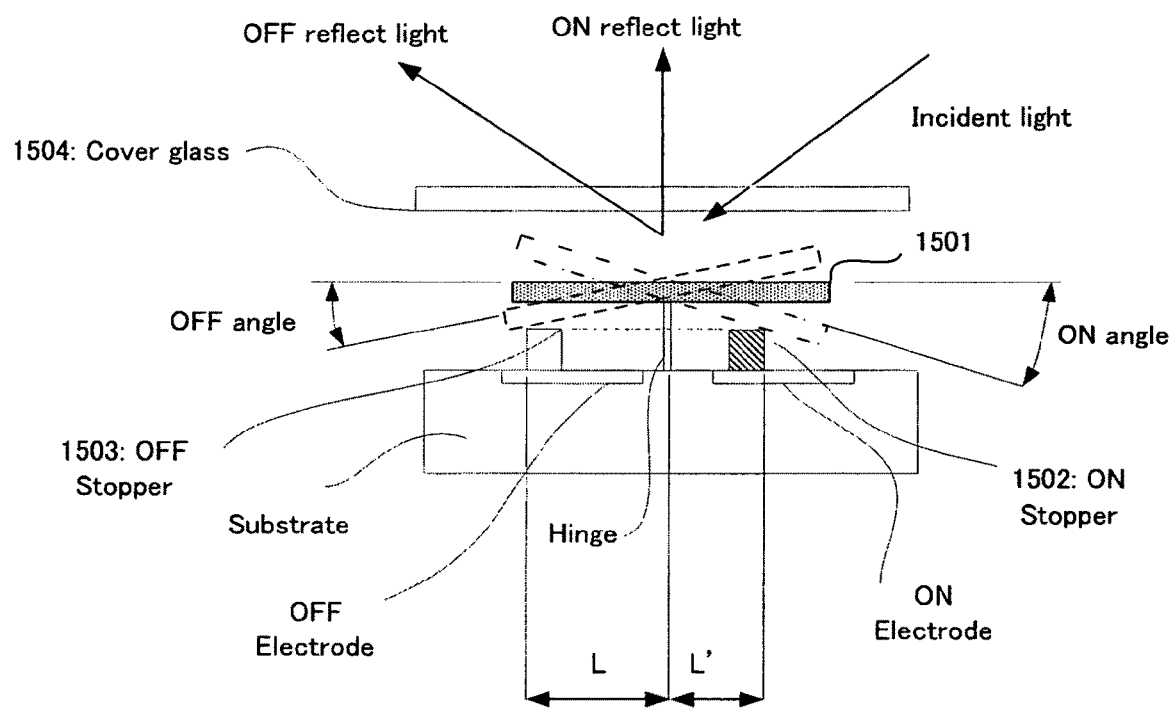
FIG. 9 illustrates an example in which the positions where stoppers are disposed are changed.

Referring now to FIG. 9 for an alternate configuration that shows the tilt angle of the mirror 1501 during the ON state is larger than the tilt angle of the mirror 1501 during the OFF state while the height of the ON stopper 1502 remains the same as that of the OFF stopper 1503. The ON stopper 1502 can be disposed such that the distance between the ON stopper 1502 and the deformable axis (L') is shorter than the distance between the OFF stopper 1503 and the deformable axis (L). Comparing with a mirror device with stoppers having different heights, the formation of stoppers with the same height has the advantage that the number of steps in manufacturing the deformable mirror device can be reduced.

Similarly, other than arranging the stoppers to have the same height, the distances between the stoppers can also be flexibly arranged to simplify the manufacturing processes. The distance between the ON stopper and the deformable axis, the distance between the OFF stopper and the deformable axis and the distance between the intermediate stopper and the deformable axis may be flexibly selected to satisfy different tilt angle requirements of the mirror.

Although not specifically illustrated in the above descriptions, each deformable pixel element of the deformable mirror device is covered with a cover glass 1504 shown in FIG. 9. Thus, the stopper provided on the electrode can be formed with a transparent stopper provided on the lower side of the cover glass. Alternatively, a stopper may be formed below of the mirror. Still alternatively, stoppers may be formed both on the electrode and on the lower side of the mirror.

In the deformable pixel elements shown in FIGS. 5A, 6A, 7A and 8, the stopper may be formed to have different structural and composition features to achieve desired tilt angles of the mirror in the ON state, OFF state and the oscillating state. For example, as shown in FIGS. 4A, 4B and 4C, the electrode is covered with a protective film 1004 that may serve the function as a stopper. In this case, the protective film provided as covering the electrode can also be referred to as a stopper.

In the deformable elements shown in FIGS. 5A, 6A, 7A and 8, although one stopper is shown for controlling and operating the mirror in the ON state, the OFF state and the intermediate state, it is understood that more stoppers may be formed as required for each of the states. Exemplary embodiments may include two ON stoppers, two OFF stoppers, and one intermediate stopper. In an exemplary embodiment, two ON stoppers are formed. These two stoppers and the hinge thus forming a three-point support to stabilize the tilted mirror during the ON state.

FIG. 8 shows the deforming stopper 1403 is formed on the mirror side. Alternately, the stoppers 1403 may be formed on the substrate side. Alternatively, the deforming stopper 1403 and the intermediate stopper 1404 may be removed by making the OFF stopper with an elastic material to stop the tilted mirror 1401 at two different positions. Still alternatively, the deforming stopper 1403 and the intermediate stopper 1404 may be eliminated and the mirror may be stopped by alternate mechanical techniques such as a ratchet mechanism to stop the tilting mirror at two different positions. Alternately, a structure that includes a movable portion may implement as well. FIG. 8 show the pixel element that is configured to have the intermediate stopper 1404 provided on the OFF electrode side and the deforming stopper 1403 abuts the intermediate stopper 1404, alternate configuration is possible. The intermediate stopper 1404 may be formed on the side of the ON electrode and the mirror control processes as described above may be flexibly applied to this configuration.

The deformable pixel elements shown in FIGS. 4C, 5A, 6A, 7A and 8, may further be configured such that when the mirror is oscillating, the movement of the mirror is not limited to free oscillation. By applying and controlling voltage to the electrode, the oscillation of the mirror may be controlled to change the tilting speed depending on the direction in which the mirror is tilted. Alternatively, the deformable pixel element may be configured such that the tilting speed of the mirror changes with time. This is achievable by applying and controlling the voltage to the electrode to accelerate or decelerate the tilting speed or deflecting speed of the mirror. Still alternatively, the above operations may be combined to form a combined oscillating mode. Otherwise, the voltage applied to the electrode can be controlled to change from one oscillating state to a different oscillating state. Furthermore, when the oscillating state is terminated, the voltage applied to the electrode can be controlled to stop the oscillation of the mirror.

In the deformable pixel elements shown in FIGS. 4C, 5A, 6A, 7A and 8, the light intensity varies depending on the ranges of the tilt angles of the mirror when the mirror is operated in the oscillating state or the intermediate state. For example, in the deformable element shown in FIG. 5A, a smaller range of the tilt angle for the mirror 1101 results in a lower light intensity projected during the intermediate state, allowing a control of reduced light intensity increment controllable with a shorter Sub-LSB. This also allows a reduce voltage applied to the electrode for tilting the mirror 1101. Conversely, by oscillating the mirror 1101 at a range of tilt angles closer to the tilt angle along the direction of the ON state, a brighter image can be projected.

The maximum tilt angle of the mirror during deflection is typically within 10 to 12 to 20 degrees. The maximum tilt angle of the mirror depends on the projection lens used. In general, a brighter lens having an F-number of 1.8 results in a large lens diameter. A darker lens results in a darker projected image. It is reasonable to use a projection lens having an F-number of about 2.4. Since a projection lens having an F-number of about 2.4 provides a lens NA corresponding to about 12 degrees, the maximum tilt angle of the mirror during deflection is preferably set to about 12 degrees. Alternatively, when a projection lens having an F-number of 1.8 is used at a cost of using a larger lens diameter, the maximum tilt angle is preferably set to 20 degrees according to the NA of the lens.

In the design of a deformable mirror device having the oscillating or intermediate state, the mirror size can be up to about 4 to 20 µm. In contrast, the mirror sizes of currently commercially available mirror devices are about 10 µm and 14 µm. The length of the mirror in the mirror deflection direction along the diagonal direction of the mirror is 14 µm and 20 µm in the commercially available mirror device. Therefore, the displacement at the tip of the mirror is up to about 2 µm (=sin 12°*20/2). This displacement becomes about half when the deflection angle of the mirror during the oscillating or intermediate state is 6 degrees.

The shorter the distance from the mirror to the electrode, the smaller the voltage applied between the mirror and the electrode. Specifically, the voltage is proportional to the second power of the distance. At the position where the deflection angle of the mirror is small, reducing the distance between the stopper and the mirror as well as reducing the distance between the electrode and the mirror can reduce the driving voltage applied to the electrodes. Alternatively, the area of the electrode can be reduced.

When the mirror size is 4 µm, the displacement at the tip of the mirror is about 0.6 µm. The minimum distance between the mirror and the electrode is only 0.6 µm. Thus, in a mirror device that is controlled to operate in an oscillating state, a smaller mirror can further reduce the voltage applied to the electrode for deflecting the mirror to the stopper.

By reducing the size of the mirror is reduced to 3 to 7 µm, the size of the device is also reduced. When the size of the mirror is 5 µm square and the number of pixels is equivalent to XGA, it is achievable to provide a display device with a diagonal dimension of approximately 0.25-inch. A 0.44 inch diagonal display device is implemented to display images with HDTV A high quality display system may use a plurality of such miniaturized display devices to simultaneously display the R, G and B colors, thereby eliminating a phenomenon called "color breakup". A system using a plurality of devices can also provide brighter images.

In the deformable pixel elements shown in FIGS. 5A, 6A, 7A and 8, the tilt angle of the mirror during the oscillating state is preferably smaller than the tilt angles of the ON and OFF states. The oscillating tilt angles are typically three-fourth or even smaller of the ON and OFF tilt angles such as one-fourth or smaller. The tilt angle of the mirror during the oscillating state is preferably 10 degrees or smaller, or 6 degrees or smaller. These preferable angles are selected based on the fact that in the deformable pixel element, as shown in FIG. 5A, a smaller tilt angle of the mirror 1101 during the oscillating state allows a smaller controllable adjustment of light intensity. The smaller tilt angle also reduces the control voltage. A preferable tilt angle of the mirror during the oscillating state can also be determined depending on the required number of grayscales. For example, in the deformable element shown in FIG. 5A, when the required number of grayscales is large, the preferable tilt angle of the mirror 1101 during the oscillating state can be set to 6 degrees or smaller, or 3 degrees or smaller. When the required number of grayscale is small, the preferable tilt angle of the mirror 1101 during the oscillating state can be set to 10 degrees or smaller.

In the deformable pixel elements shown in FIGS. 6A, 7A and 8, the distances between the electrode and stoppers may be flexibly arranged. The flexibilities of distance arrangement may includes the distance between the ON stopper and the deformable axis in the ON state, the distance between the OFF stopper and the deformable axis in the OFF state and the distance between the intermediate stopper and the deformable axis in the oscillating state.

The deformable pixel elements shown in FIGS. 5A, 6A, 7A and 8 may be configured such that the maximum tilt angle of the mirror during the oscillating state is equal to, smaller than, or greater than the tilt angle of the mirror during the ON or OFF state. The voltage for controlling the oscillation amplitude during the oscillating state may be equal to or smaller than the voltage for controlling the ON or OFF state.

In addition, in the above-mentioned deformable pixel element, control can be performed such that the mirror can be controlled to operate in the ON state or the OFF state after the oscillation amplitude of the mirror in the oscillating state is attenuated by a predetermined amount.

In the above-mentioned deformable pixel element, the voltage applied to the electrode when the mirror is controlled in the intermediate state can be different from the voltage applied operate the mirror in an ON or OFF state.

In the above-mentioned deformable pixel element, the spring elastic force of the hinge that supports the mirror in some of the exemplary embodiments can be different depending on the deflection direction.

Furthermore, in the above-mentioned deformable pixel element, the mirror in some of the exemplary embodiments is connected to the ground (GND) of the control circuit for controlling the mirror for example as shown in FIGS. 4A through 4C.

In the above-mentioned deformable pixel element, the mirror tilts when the voltage is applied to the electrode because there is electrostatic force (also referred to as coulomb force) between the electrode and the mirror by the application of the voltage to the electrode. By applying different voltages on the electrodes, different electrostatic forces may be applied between the electrode and the mirror. The electrostatic force therefore depends on the value of the voltage applied to the electrode.

This invention therefore includes a display system implemented with a deformable mirror device having any one of the deformable pixel elements described above. One embodiment of such display system is implemented with a deformable mirror device having the deformable element shown in FIG. 5A.

Figure 10:
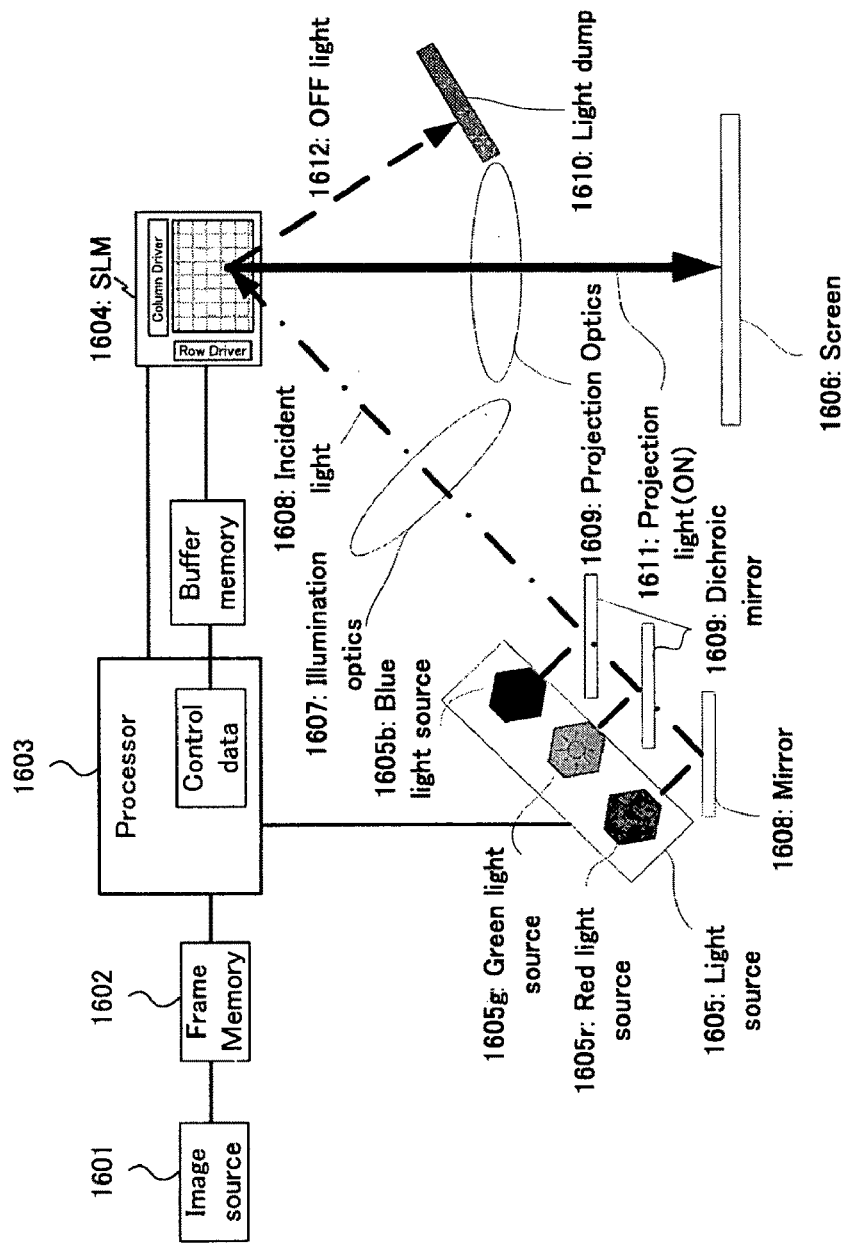
FIG. 10 illustrates one example of a display system with a deformable mirror device having the deformable element illustrated in FIG. 5A.

Referring now to FIG. 10 that shows a display system wherein the image data is inputted from an image source 1601 through a frame memory 1602. A processor 1603 controls an SLM 1604 that is implemented as a deformable mirror device. A light source 1605 projects an image according to the image data on a screen 1606. The light source 1605 includes a red light source 1605r, a green light source 1605g and a blue light source 1605b. The light sources sequentially emits red light, green light and blue light under the control of the processor 1603 at least at 180 Hz for each color in one frame period. The light source 1605 preferably emits each color light at 360 Hz in the order of R, G and B in a repetitive manner. The light emitted from the light source 1605 enters illumination optics 1607 via mirrors 1608 and dichroic mirrors 1609 and then impinges on the SLM 1604. Each of the light sources 1605 may be implemented as a laser or an LED that can easily emit pulsed light. When a white light-emitting light source, such as a high-pressure mercury lamp, is used, the dichroic mirrors 1609 may be replaced with a color filter wheel. The color filter wheel may be placed in the illumination light path or the projection light path, so as to sequentially emit red, green and blue light. The processor 1603 drives a column driver and a row driver in the SLM 1604 to operate mirrors of a plurality of deformable elements arranged in an array in the ON state, the OFF state, or the oscillating or intermediate state as described above. The incident light 1608 is reflected from the SLM to the projection optics 1609 or a light dump 1610. The light reflected to the projection optics 1609 (Projection light (ON light) 1611) is projected onto the screen 1606. The light dump 1610 absorbs the light reflected to the light dump along the direction of the OFF light 1612.

The light source implemented with either a laser or an LED allows for controlling and driving the light as pulsed light. A high-pressure mercury lamp or similar kinds of light sources have no such control features. A control of the light pulses thus allow flexible change the light emission intensity. Light intensity control allows for a control of changing the light intensity in synchronization with the control timing for operating the mirror in the oscillating state or the intermediate state. For example, by projecting one-sixteenth of the light intensity to the projection lens in the oscillating or intermediate state, the controllable and adjustable illumination light intensity can be reduced to one half to achieve one-thirty second of the light intensity. This further increases the number of controllable grayscales of a display system.

The period during which the mirror is operated in the oscillating or intermediate state is only for a predetermined portion or portions of one frame. In this way, unwanted light from the substrate of the deformable mirror device and the optical system is attenuated. By attenuating the illumination light intensity, improved contrast of image display can be achieved even with lower grayscales. Additionally, since a laser or an LED has a broad color reproduction range, fuller and richer colorful images can be displayed by combining a laser or an LED with a mirror device having an oscillating or intermediate state.

Figure 11:
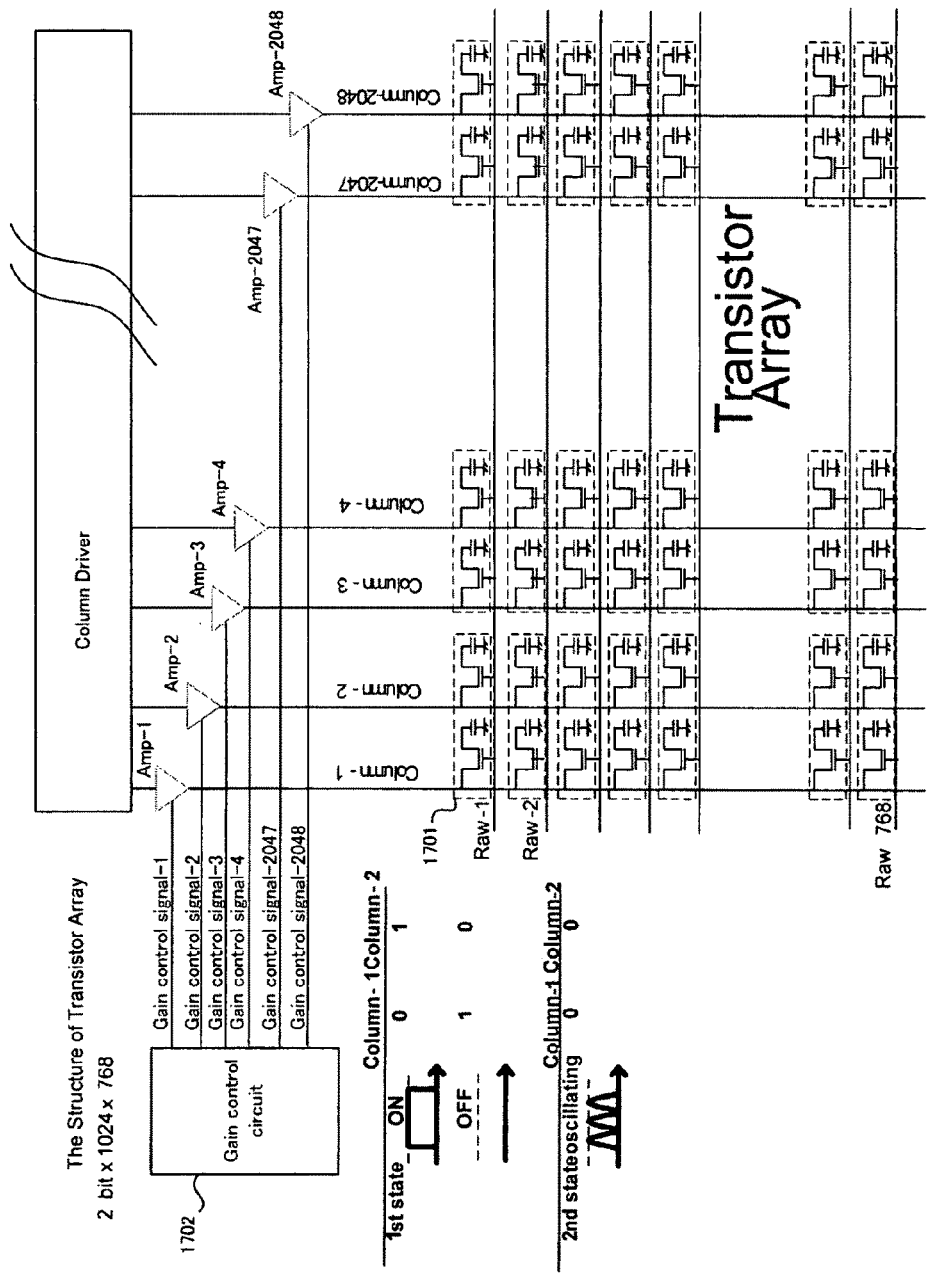
FIG. 11 illustrates a transistor array structure of the SLM illustrated in FIG. 10.

FIG. 11 shows a transistor array structure of the SLM 1604 as an embodiment for the transistor array shown in FIG. 10. FIG. 11 shows a 2-bit×1024×768 transistor array structure. In FIG. 11, each portion surrounded by the dotted line corresponds to a deformable element. Each of the deformable elements is controlled by two Column signals and one Row signal. The deformable element 1701 shown in the upper left part of FIG. 11 is controlled by the Column-1 signal, the Column-2 signal and the Row-1 signal. More specifically, when the Row-1 signal is set as a predetermined signal, the Column-1 signal of "0" and the Column-2 signal of "1" cause the mirror to operate in the ON state. When the Column-1 inputs a signal of "1" and the Column-2 inputs a signal of "0", the mirror operates in the OFF state. When the mirror is operated in the OFF state, the Column-1 signal of "0" and the Column-2 signal of "0" cause the mirror to operate in the oscillating state.

Figure 12:
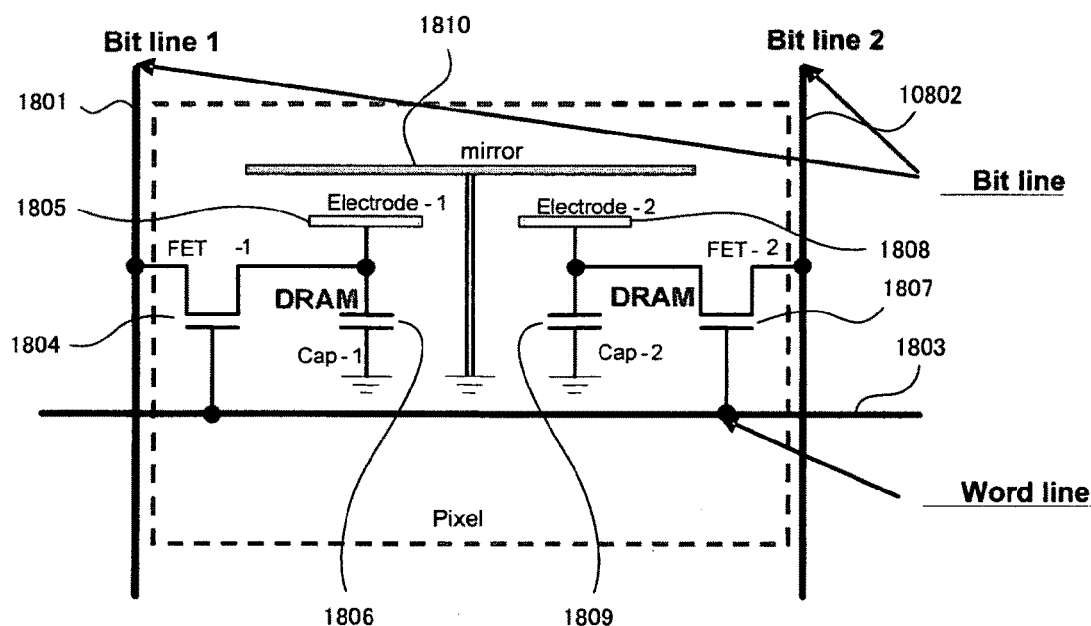
FIG. 12 illustrates a circuit diagram of the deformable element illustrated in FIG. 11.

FIG. 12 shows a circuit diagram of the deformable pixel element as an embodiment of the deformable pixel element as that shown in FIG. 11. In FIG. 12, two bit lines 1801, 1802 correspond to the two Column signals described above. A word line 1803 corresponds to the one Row signal described above. In the circuit shown in FIG. 12, a FET-1 (Field Effect Transistor) (1804) is connected between an electrode-1 (1805), the bit line 1 (1801) and the word line 1803. A capacitor Cap-1 (1806) is connected between the electrode-1 (1805) and the GND. Similarly, a FET-2 (1807) is connected between an electrode-2 (1808), the bit line 2 (1802). The word line 1803, and a capacitor Cap-2 (1809) is connected between the electrode-2 (1808) and the GND. By controlling the bit line 1 (1801) and word line (1803) signals in the circuit as shown, a predetermined voltage is applied to the electrode-1 (1805) to tilt the mirror 1810 toward the electrode-1 (1805). Similarly, controlling the bit line 2 and word line signals apply a predetermined voltage applied to the electrode-2 (1808) to tilt the mirror 1810 toward the electrode-2 (1808). In FIG. 11, an amplifier (Amp) is connected to each of the bit lines. An output voltage signal from a gain control circuit 1702 controls the output voltage from each of the column lines. In this way, the voltage applied to the electrode disposed in each mirror pixel is changed to change and control the electrostatic force for deflecting the mirror.

Figure 13:
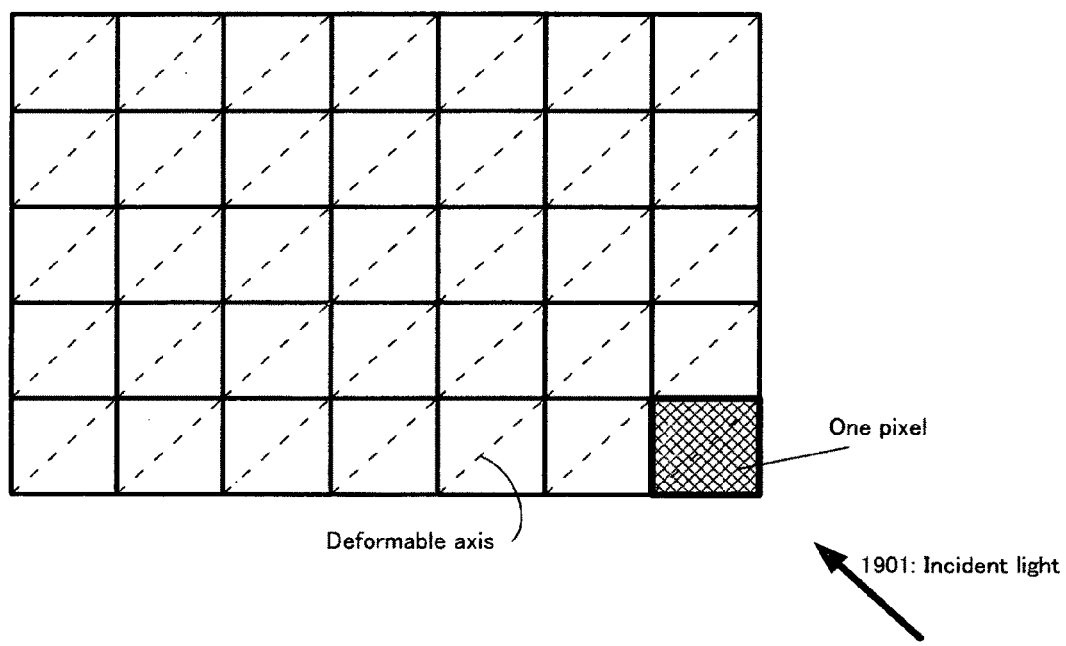
FIG. 13 diagrammatically illustrates mirrors of part of an array of a plurality of deformable elements of the SLM illustrated in FIG. 10.

FIG. 13 is a mirror diagram for showing an array of a plurality of deformable elements of the SLM 1604 as an exemplary embodiment of the deformable mirror elements shown in FIG. 10. In FIG. 13, the portion surrounded by the solid line corresponds to the mirror of the deformable element. The mirror of one deformable element corresponds to one pixel. The dotted line indicates the deformable axis of the mirror. As shown in FIG. 13, incident light 1901 impinges on the mirror along a normal direction perpendicular to the deformable axis as described above.

In this embodiment, a display system with one deformable mirror device is implemented. It is understood that an image display system by applying a plurality of deformable mirror devices as discussed above can also be realized.

The number of television pixels is currently 1280 by 720 or 1920 by 1080 in accordance with the HDTV standard. On the other hand, in the field of digital cinemas, a 4096 by 2160 (4 k by 2 k) pixel-based standard is proposed. In the NHK Science and Technical Research Laboratories, a 7680 by 4320 pixel-based super high definition imaging system (super high-vision) is being developed for future use. This system uses an R/G/G/B four-chip display panel. The standard for grayscale using 8 bits to 16 bits per color has been established in accordance with HDMI, which is one of the connection standards between displays and image reproducing apparatuses. Furthermore, color display or process may be handled in accordance with the xvYCC standard. The Standard is superior to the conventional sRGB standard. These image-related standards have been developed for providing images of higher display quality with increased realism. Moreover, digital cameras having as many as 10 million pixels are commercially available.

The deformable mirror device having the oscillating or intermediate state according to the invention described above have the advantage and benefits that such systems have longer life time, lower control voltages and increase levels of gray scales. The display system can therefore be applied to display images with higher resolutions with higher contrast and brighter light intensity. The deformable mirror device according to the invention is also suitable for displaying next-generation images with further enhanced and improved image qualities as defined by higher display Standards anticipated to implemented in future emerging display devices. It is also suitable for use with a display for displaying still images.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A mirror device which deflects incident light, comprising:
   a mirror arranged on a substrate and supported by a hinge;
   a first address electrode and a second address electrode disposed on opposite sides across said hinge on said substrate for deflecting the mirror to an ON state, an OFF state, or an oscillating state;
   a drive circuit applying a plurality of voltage pulses to the first address electrode and the second electrode for controlling said mirror to continuously oscillate at a specific oscillation frequency in a controlled time period within a display frame period between said first address electrode and second address electrode serving also as a first stopper and a second stopper respectively wherein said mirror further projects a reflection light having an intermediate light intensity in said controlled time period within said display frame period to an image projection lens wherein the intermediate light intensity is a partial portion of a full light intensity reflected from said mirror to said image projection lens when said mirror is operated in the ON state; and
   said drive circuit controls the intermediate light intensity by adjusting said oscillation frequency in said controlled time period within said display frame period and said plurality of voltage pulses.

2. The device according to claim 1, wherein:
   said drive circuit further applies a zero voltage to both said first address and second address electrodes, represented by a voltage of (0,0), during at least a portion of said oscillating state to allow said mirror to continuously oscillate freely in said controlled time period within said display frame period for modulating said intermediate light intensity reflected from the mirror.

3. The device according to claim 1, wherein:
   the drive circuit further controls the mirror to continuously oscillate in said controlled time period within said display frame period in said intermediate state to control said intermediate light intensity between a range of ¼ to ¾ of said full light intensity as that reflected by said mirror in said ON state.

4. The device according to claim 1, wherein:
   the drive circuit further controls said mirror to continuously oscillate in said time period within said display frame period by applying a zero voltage, represented by a (0,0) voltage to said first and second address electrodes beginning from a time when said mirror is at said ON state or OFF state to allow said mirror to continuously oscillate freely in said time period within said display frame period.

5. The device according to claim 1, wherein:
   said first address and second address electrodes functioning as said first stopper and said second stopper having different height supported and supported on said substrate.

6. The device according to claim 1, wherein:
   said first address and second address electrodes functioning as said first stopper and said second stopper are disposed at different distances on two opposite sides from said hinge on said top surface of said substrate.

7. The device according to claim 1, further comprising:
a third address electrode for receiving control signals from said control circuit to control said mirror to operate in an intermediate state for reflecting a light of said intermediate light intensity.

8. The device according to claim, 7 wherein:
said third address electrode is disposed away from said first and second address electrode on said substrate.

9. The device according to claim, 7 wherein:
said third address electrode is disposed near one of said first and second address electrode on said substrate.

10. The device according to claim 1, further comprising:
an elastic stopper for regulating and limiting a maximum deflection angle of the mirror in addition to said first and second electrodes to operate and control said mirror in an intermediate or oscillating state.

11. A mirror device that deflects incident light, comprising:
a mirror arranged on a substrate and supported by a hinge;
a plurality of address electrodes for deflecting the mirror to an ON state, an OFF state, or an oscillating state or an intermediate state; and
a drive circuit for applying a plurality of voltages to the address electrodes for generating different electrostatic forces between the address electrode and said mirror for deflecting said hinge for tilting and continuously oscillating the mirror in a controlled time period within a display frame period to reflect an intermediate amount of light for image display less than a fully-On image display light.

12. The device according to claim 11, wherein:
said drive circuit applying said voltage to the address electrodes disposed on two opposite sides across said hinge for deflecting said mirror to tilt to an ON and OFF angular positions along a first deflection axis and applying said voltage to an intermediate address electrode disposed away from an axis connected between of said ON and OFF electrodes for deflecting said mirror to tilt to an intermediate angle along a second deflection axis different from said axis connected between said ON and OFF electrodes.

13. The device according to claim 11, wherein:
a maximum deflection angle of said continuous oscillation of the mirror in the oscillating state is smaller than a deflection angle of the mirror in the ON state or the OFF state.

14. The device according to claim 11, wherein:
a maximum deflection angle of said continuous oscillation of the mirror in the oscillating state is larger than a deflection angle of the mirror in the ON state or the OFF state.

15. The device according to claim 11, further comprising:
a stopper unit for regulating and limiting a maximum deflection angle of said continuous oscillation of the mirror in said oscillating state.

16. The device according to claim 15, wherein:
the driver circuit applies a first set of voltages to the address electrodes to control the mirror to operate in the intermediate state and applies a second set of voltages to the address electrodes to control the mirror to operate in the ON state or the OFF state wherein the first set of voltages are different from the second set of voltages.

17. The device according to claim 11 wherein:
the driver circuit controls the mirror to continuously oscillate in said controlled time period within said display frame period substantially in a range between three to twelve degrees relative to the substrate.

18. The device according to claim 11, wherein:
the driver circuit controls the mirror to tilt to a deflection angle in the ON state or the OFF state substantially in a range between −16 to +16 degrees or smaller relative to the substrate.

19. The device according to claim 11, wherein:
the driver circuit controls the mirror to continuously oscillate in said controlled time period within a display frame period between an angle that is about three-fourth to one-fourth of the deflection angles of the ON and OFF state.

20. The device according to claim 12, wherein:
the intermediate address electrode extends vertically from the substrate; and
the intermediate address electrode is disposed at a location to function as a stopper unit for limiting a maximum tilt angle of the mirror during an intermediate or oscillating state.

21. A mirror device that deflects incident light, comprising:
a mirror arranged on a substrate and supported by a hinge extended from and substantially perpendicular to the substrate;
a plurality of address electrodes for deflecting the mirror to an ON state, an OFF state, or an oscillating state or an intermediate state wherein said address electrodes are disposed along at least a first axis and a second axis interconnecting said electrodes; and
a drive circuit for applying a voltage to the address electrodes for deflecting said hinge for tilting and oscillating the mirror along at least two different deflection axes depending on angular orientations of said first axis and said second axis.

* * * * *